US005513177A

United States Patent [19]
Sakurai et al.

[11] Patent Number: 5,513,177
[45] Date of Patent: Apr. 30, 1996

[54] DISTRIBUTED SWITCHING SYSTEM HAVING AT LEAST ONE MODULE

[75] Inventors: Yoshito Sakurai; Shinobu Gohara, both of Yokohama; Kenichi Ohtsuki, Kanagawa; Takao Kato, Yokohama; Hiroshi Kuwahara; Eiichi Amada, both of Kodaira, all of Japan

[73] Assignee: Hitachi, Ltd., Tokyo, Japan

[21] Appl. No.: 654,590

[22] Filed: Feb. 13, 1991

Related U.S. Application Data

[63] Continuation of Ser. No. 96,011, Sep. 14, 1987, Pat. No. 5,043,979.

[30] Foreign Application Priority Data

Sep. 16, 1986 [JP] Japan .................................. 61-215767
Sep. 16, 1986 [JP] Japan .................................. 61-215768
Feb. 25, 1987 [JP] Japan .................................. 62-40205

[51] Int. Cl.⁶ .................................................. H04Q 11/04
[52] U.S. Cl. .............................. 370/58.1; 370/54; 370/60; 370/94.1
[58] Field of Search .......................... 370/60, 60.1, 61, 370/63, 85.1, 94.3, 58.1, 54, 59, 58.3, 110.1, 63, 13, 95.3, 94.1; 379/269

[56] References Cited

U.S. PATENT DOCUMENTS

| | | | |
|---|---|---|---|
| 4,009,347 | 2/1977 | Flemming et al. | 370/95.3 |
| 4,058,672 | 11/1977 | Crager et al. | 370/60 |
| 4,058,838 | 11/1977 | Crager et al. | 370/60 |
| 4,152,548 | 5/1979 | Horiki | 370/110.1 |
| 4,312,065 | 1/1982 | Ulug | 370/94.2 |
| 4,345,324 | 8/1982 | Smitt | 370/13 |

(List continued on next page.)

OTHER PUBLICATIONS

Sakurai et al. 'Asynchronous Transfer Mode Technology for Broadband ISDN,' Denshi Tokyo, No. 29 (1990).
Garetti R. Melen et al. 'An Experimental ATM Switching Architecture for the Evolving BISDN Scenario,' XIII International Switching Symposium, Session A5, Paper #3, Proceedings, vol. IV, Stockholm, Sweden, May 27–Jun. 1, (1990).
Tanabe et al. 'A New Distributed Switching System Architecture for B–ISDN' IEEE International Conference on Intergrated Broadband Services and Networks Oct. (1990).
Gohara et al. 'A New Distributed Switching System Architecture for Media Integration' IEEE (1987).
Digital Switching Method' Mar. 15 (1986).
Suzuki et al. 'A Study on the Architecture of the ATM Switching Network' SSE89–32–46 vol. 89, No. 126 (1989).
Takatsuka et al. 'An 8 Input 8 Output Shared Buffer ATM Switch LSI' LSI Design Methodology with Higher Performance, B–462 (1991).
Yamanaka et al. 'A High Speed ATM Switch Architecture Based on Multiple Shared Buffer Memories' B–467 Communication Systems Development Laboratory, Mitsubishi Electric Corporation.

*Primary Examiner*—Douglas W. Olms
*Assistant Examiner*—Shick Hom
*Attorney, Agent, or Firm*—Antonelli, Terry, Stout & Kraus

[57] ABSTRACT

A switching system for integratedly switching voice, data, image information and the like. The switching system comprises a plurality of front-end modules each adapted to perform a switching processing in association with a subscriber line or a trunk line, and a single or a plurality of central modules for interconnecting the plurality of front-end modules in star-type fashion and switching information prevailing between the front-end modules, in unit of block accommodating the information and a header added thereto to contain connection control information and in accordance with the contents of the header. The front-end modules are connected to the central module via inter-module highways each having frames occurring at a predetermined period and time slots contained in each frame to carry blocks.

36 Claims, 16 Drawing Sheets

U.S. PATENT DOCUMENTS

| | | | |
|---|---|---|---|
| 4,450,557 | 5/1984 | Munter | 370/58 |
| 4,486,875 | 12/1984 | Kelleher | 369/170 |
| 4,491,945 | 1/1985 | Turner | 370/60 |
| 4,516,238 | 5/1985 | Huang et al. | 370/60 |
| 4,644,529 | 2/1987 | Amstutz et al. | 370/60 |
| 4,685,104 | 8/1987 | Johnson et al. | 370/59 |
| 4,686,701 | 8/1987 | Ahmad et al. | 379/269 |
| 4,720,854 | 1/1988 | Sand | 370/58.3 |
| 4,757,497 | 7/1988 | Beierle et al. | 370/85.12 |
| 4,809,261 | 2/1989 | Ratcliff | 370/60 |
| 4,866,702 | 9/1989 | Shimizu et al. | 370/94.3 |
| 4,910,731 | 3/1990 | Sakurai et al. | 370/67 |
| 4,947,388 | 8/1990 | Kuwahara et al. | 370/60 |
| 4,956,839 | 9/1990 | Torii et al. | 370/60 |
| 4,958,341 | 9/1990 | Hemmady et al. | 370/60.1 |
| 5,043,979 | 8/1991 | Sakuari et al. | 370/63 |

F I G. 1
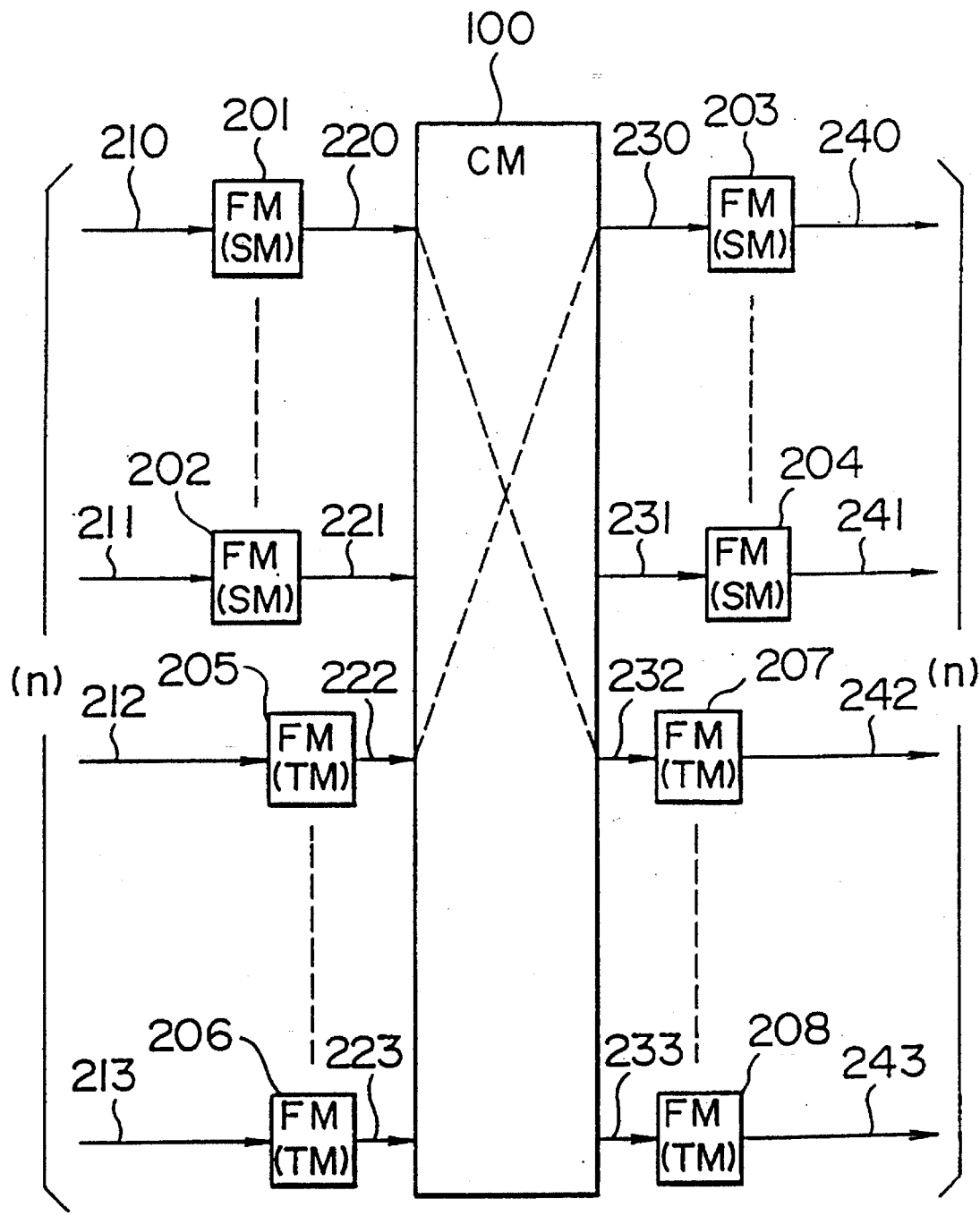

FIG. 5

| SYMBOL | CONTENTS |
|---|---|
| BC | 0 : IDLE<br>1 : BUSY |
| BI | 00 : FOR CIRCUIT SWITCHING CALL<br>01 : FOR STORE AND FORWARD—SWITCHING CALL<br>10 : PREPARATORY<br>11 : CALL CONTROL INFORMATION |
| DA | RECEIVING FM NUMBER |
| SA | SENDING FM NUMBER |
| BN | USED BLOCK NUMBER<br>(FOR CIRCUIT SWITCHING CALL) |
| CN | CALL REFERENCE NUMBER<br>(FOR STORE AND FORWARD SWITCHING CALL) |

F I G. 10
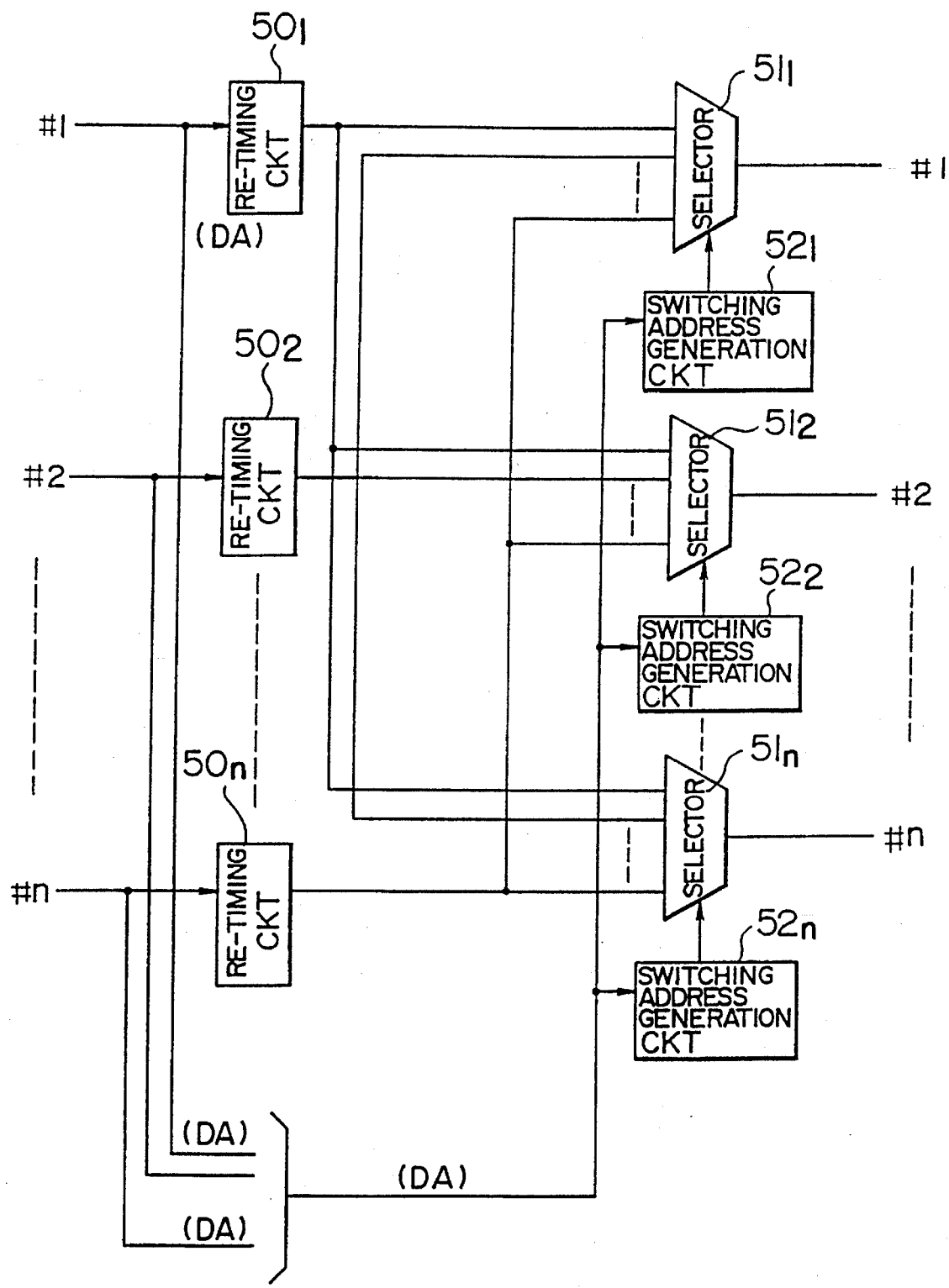

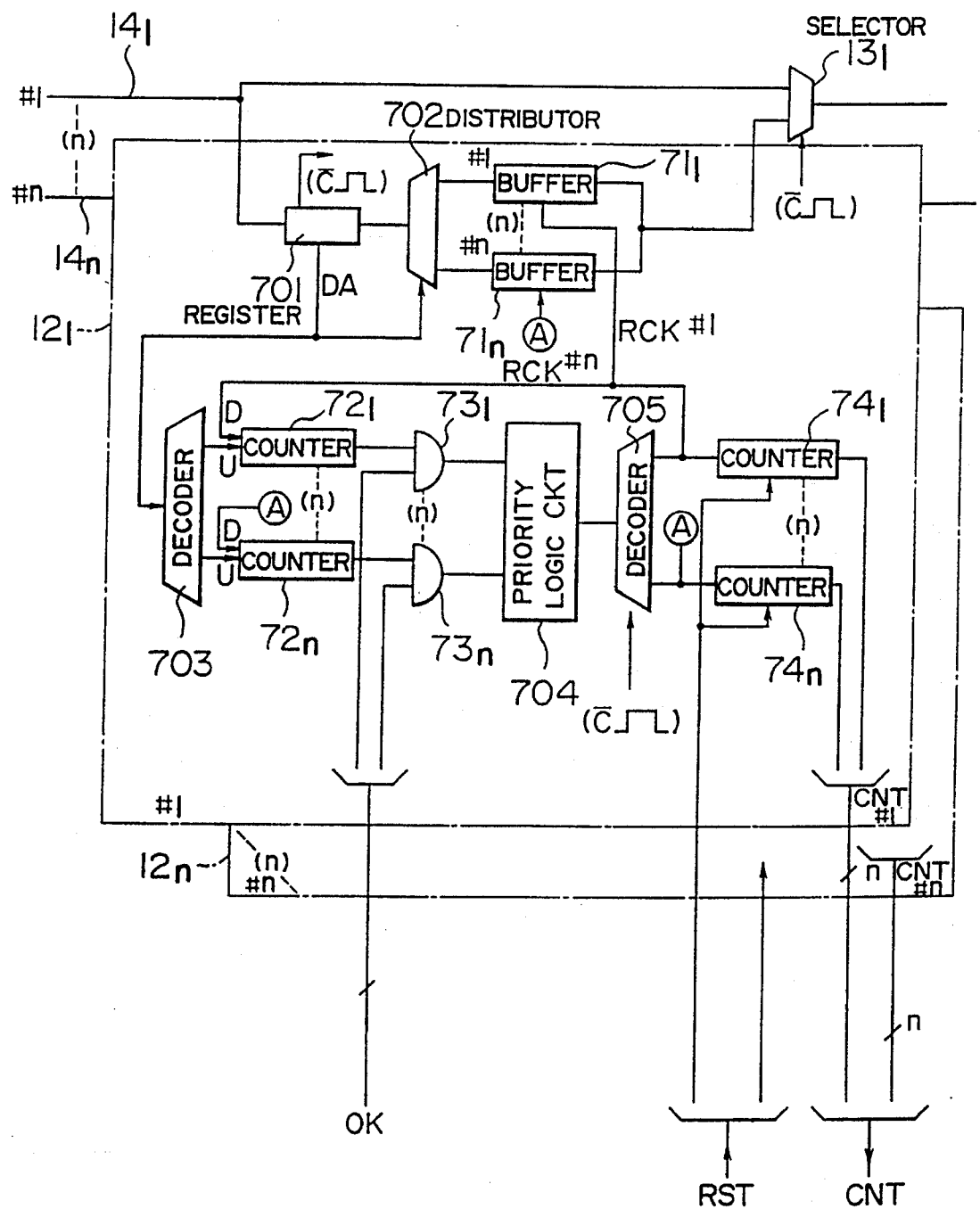
F I G. 13

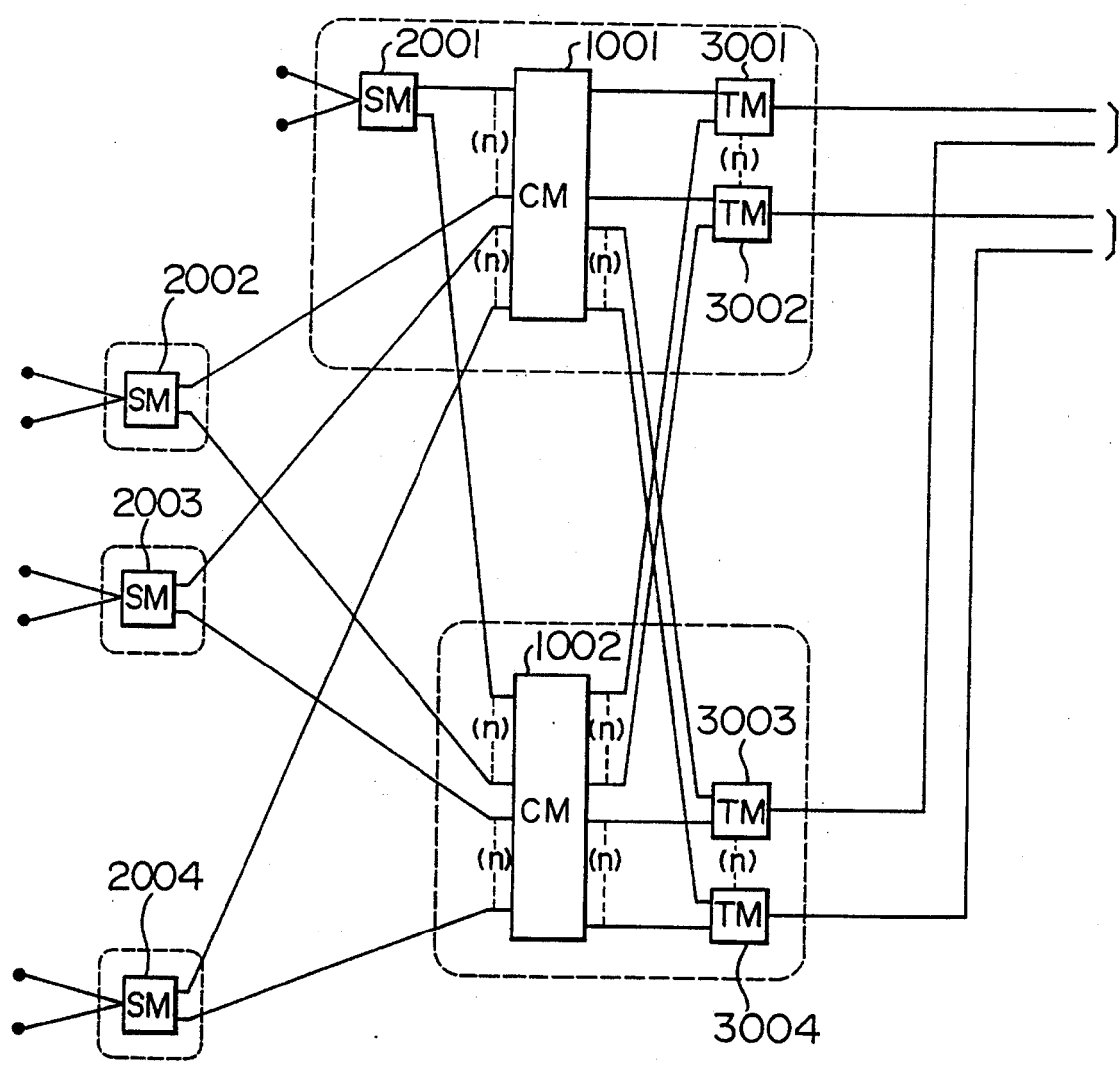
F I G. 17

DISTRIBUTED SWITCHING SYSTEM HAVING AT LEAST ONE MODULE

This is a Continuation of application Ser. No. 096,011 filed Sep. 14, 1987 which issued a U.S. Pat. No. 5,043,979.

BACKGROUND OF THE INVENTION

1. Field of the Invention

This invention relates to a switching system adapted to perform switching processings of voice, data, image information and the like and more particularly to a time-division channel arrangement suitable for performing switching of information, in a unit of a block accommodating communication control information, between switching nodes or modules in a star-type configuration.

2. Description of the Related Art

In the field of switching systems, studies have been concentrated on the realization of high-speed and wide band performance, increase in the capacity of the channel and advanced improvements in reliability. Conceivably, a specified expedient to this end resides in the decentralization of a channel system, especially, a multiplexer stage. This expedient takes advantage of the decentralization of load which contributes to improvement in throughput, increase in the capacity of the overall exchange and risk-decentralization owing to the decentralization of the channel system.

In the past, the exchange has played a major role in switching low-speed telephone voice, but it is expected that high-speed data communications as applicable to image data will be in great demand in the future. Under the circumstances, the exchange is required to be drastically improved in call throughput but throughput of a processor can not be extended unlimitedly. To promote the throughput of the processor, the distribution of function and the distribution of load based on a multi-processor scheme may conceivably be adopted. This countermeasure, however, invites complexity of software and besides suffers from a bottleneck caused by communications between processors and peripherals such as magnetic disks, printers, etc., thus failing to eliminate the limitation imposed on the throughput.

Incidentally, from the standpoint of the enlargement of the system and the decentralization of risks such as system breakdown, call congestion or intended or unintended destruction of a switching system, it is desirable that individual function units of the exchange be realized with individual modules and these modules be physically distributed. In such an instance, unless an independent distribution configuration is adopted wherein processors per se are distributed, the load will be concentrated on a central processor and inconveniently the number of lines for controlling each distributed module will be increased.

In a distributed type switching system in which the speech path system is distributed and the control system is concentrated at a location, throughput of the control system is limited and the merits of the distribution of load can not fully mature to advantage. Under the circumstances, a foreseen switching system is desired to be of an independent distributed configuration in which not only the speech path system but also the control system is distributed. The use of independent modules is however problematic in that when a module communicates with another module, the sending module has to know whether a channel to the partner module is idle and whether an outgoing circuit from the partner module is idle. In other words, resource management is needed. Even in the ordinary distributed system, resource management is often concentrated at a location and all modules interrogate a common managing unit. Consequently, a bottleneck of processing is caused by the managing unit, especially, in a large-scale system. On the other hand, the system of full independent distributed modules is forced to take either a way to enable one module to constantly know the status of all of the other modules or a way to permit one module to confirm the status of the partner module each time a call is set up. In the former way, one module, when its status changes, is required to inform all remaining modules of the change or all of the modules must mutually confirm their status periodically. Even with the above procedure completed, when a module has only one idle circuit, there is a possibility that the remaining modules will transmit communication requests to that module at the same time. In the latter way, the above problems are not encountered but the necessity of mutual communications among all of the modules is by itself problematic. As a countermeasure, it is conceivable to establish communication lines in a mesh configuration among the modules. However, this becomes costly due to the complicated physical geometry and due to the fact that additional management of communication is needed.

Incidentally, in recent years, the trend of integratedly communicating various kinds of information including voice and data has become active. This trend originates from a desire for efficiency and economization but realization of the integrated communications needs integrated switching processings of various kinds of information. In particular, it is desired that switching of circuit switching information such as voice of which real-time base processings are required and switching of storable data or storage switching information which has hitherto been handled by a packet exchange can both be effected integratedly through the same channel.

A time-division channel arrangement for integratedly handling voice and data, that is, a so-called integrated channel arrangement is known as disclosed in JP-A-61-60044 entitled "Block switching system" and JP-A-60-127844 entitled "Circuit/packet integrated switching system". In the former literature, also as disclosed in Proceedings of International Switching Symposium 1987 SESSION B.7.1 "ELASTIC BASKET SWITCHING—A NEW INTEGRATED SWITCHING SYSTEM FOR VOICE AND HIGH-SPEED BURST DATA—" by S. Morita et al, a boundary identifier indicative of the boundary between communication channels is dynamically set in accordance with the amount of information in a set-up call in order that either of information requiring real-time base processing and information requiring burst base processing can be switched one-dimensionally. In the latter literature, also as disclosed in Proceedings of International Switching Symposium 1984 SESSION 42B-3 "SYNCHRONOUS COMPOSITE PACKET SWITCHING FOR ISDN SWITCHING SYSTEM ARCHITECTURE" by T. Takeuchi et al, a plurality of distributed communication nodes are connected in loop, the communication node being a switching module having a subscriber interface or a trunk interface, and each switching module packets circuit switching information such as voice and packet switching information such as data in blocks of fixed length in accordance with destination switching modules and adds a destination node number to each block, so that the information may be switched through the loop channel.

In the aforementioned "Block switching system", the time switch function of the channel can efficiently be realized but because of each block being of a variable length, the space switch function of the channel for mutually rearranging blocks on a highway is difficult to achieve. Accordingly, this system is unsuitable for a large-scale exchange.

In the aforementioned "Circuit/packet integrated switching system", on the other hand, all of the switching modules access the loop and in order to prevent the overall throughput from being decreased, the loop must be operated at so high a speed that the total of amounts of throughput of the individual modules can be handled by the loop. Accordingly, the larger the scale of the exchange, the more the high-speed device will be used in the interface between each switching module, and the loop becomes expensive.

In order to solve these problems, it is effective to use a block of fixed length which accommodates connection information and to construct a self-routing network which does not use a loop. However, while the use of the loop is convenient in that all the blocks carried on the loop can be processed sequentially with ease, a plurality of blocks used in, for example, the star-type configuration must be rearranged to prevent them from colliding with each other at a time within the central node. To this end, avoidance of concentration of individual blocks on a specified connection destination (outgoing highway) is necessary and blocks once stored must be controlled for switching such that they do not collide with each other, by monitoring destinations of individual blocks. However, in the case of switching communication information, intensively bursty, as appearing in a kind of data communications (for example, image information transfer), many blocks must be sent to the same destination within a short period of time but in the case of switching information requiring real-time base processing, such as voice, storage of blocks must be avoided as far as possible.

Reference may be made to JP-A-59-23658, U.S. Pat. No. 4,494,230 and International Publication No. WO85/02735 (coressponding to JP-A-60-501833).

SUMMARY OF THE INVENTION

An object of the present invention is to provide an economical and high-throughput switching system.

Another object of the invention is to provide a highly reliable switching system based on the distribution of load and the decentralization of risks.

Still another object of the invention is to provide a time-division channel arrangement capable of meeting both the requests for real-time base processing and burst base processing.

According to the invention, to accomplish the above objects, a switching system comprises a plurality of front-end modules each adapted to perform a switching processing in association with a subscriber line or a trunk line, and a single or a plurality of central modules for interconnecting the plurality of front-end modules in star-type fashion via highways and switching information prevailing between the front-end modules, in a unit of a block accommodating the information with a header added thereto to contain connection control information and in accordance with the contents of the header.

Fundamentally, each of the front-end modules functions to determine a destination path for communication information coming from a subscriber line or a trunk line. Specifically, with the use of each inter-module highway having frames occurring at a predetermined period and a plurality of time slots contained in each frame the number of which is determined in predeterminedly ruled relationship with the number of subscriber line or trunk lines accommodated in the front-end module, each front-end module functions to transmit to the highway a block which accommodates the communication information and a header containing a destination front-end module number by loading the block on the time slots, functions to manage the status of the subscriber line or trunk line by constantly storing an idle/busy status thereof, functions to decide the idle/busy status of the subscriber line or trunk line, and functions to transmit and receive a result of the decision between the plurality of front-end modules.

The central module comprises a plurality of time switches connected to the front-end modules via the highways, a space switch connected to the time switches, a first status managing memory for monitoring every frame an idle/busy status of a link in association with an incoming highway of the space switch, a second status managing memory for monitoring in every frame an idle/busy status of a link in association with an outgoing highway of the space switch, and a circuit for generating a read address or a write address for each of the plurality of time switches by looking up the first and second status managing memories, in such a manner that a plurality of blocks having the same destination are not switched at the same time.

Further, in the central module of the invention, each incoming highway associated with each incoming front-end module has branches for the purpose of handling both the circuit switching information and packet switching information, one branch being directly connected to the time switch and the other being connected to a storage circuit, and the storage circuit is selectively used.

By selectively using the storage circuit, the communication information such as voice of which the real-time base processing is required (circuit switching information) can directly be delivered from the incoming highway to the time switch without being passed through the storage circuit, so that real-time base processing can be completed. On the other hand, the storable communication information (storage switching information) is temporarily stored in the storage circuit, so that the storage switching information can be switched through the use of the same channel as used for the circuit switching information.

The present invention was disclosed by some of the present inventors in an article entitled "A NEW DISTRIBUTED SWITCHING SYSTEM ARCHITECTURE FOR MEDIA INTEGRATION" published on Jun. 10, 1987, PROCEEDINGS OF IEEE INTERNATIONAL CONFERENCE '87 SESSION 11.4.

BRIEF DESCRIPTION OF THE DRAWINGS

FIG. 1 is a block diagram showing the overall construction of a switching system of the invention.

FIG. 5 explains the contents of a header in the FIG. 4 block.

FIG. 10 is a block diagram of a space switch shown in FIG. 9.

FIG. 13 is a block diagram of a packet buffer shown in FIG. 9.

FIG. 17 is a block diagram illustrating an exemplary configuration of the system.

DESCRIPTION OF THE PREFERRED EMBODIMENTS

Figure 2:
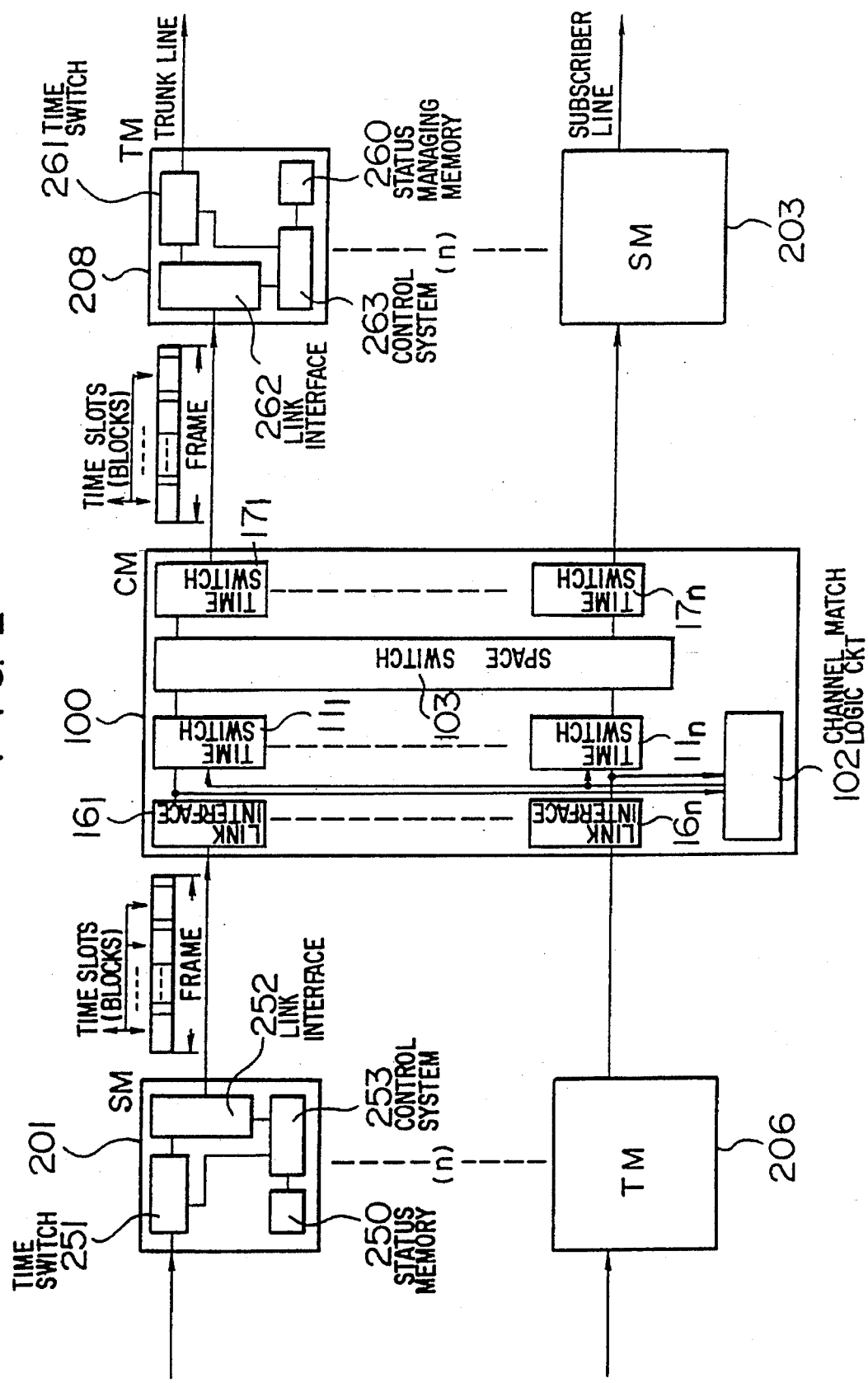
FIG. 2 is a block diagram showing a configuration specifying the FIG. 1 system.

The invention will now be described by way of example with reference to the accompanying drawings. In describing preferred embodiments of the invention, the overall architecture of a switching system using time-division channels according to the invention will first be outlined for better understanding of the embodiments. FIG. 1 illustrates a fundamental configuration of the switching system to which a time-division channel arrangement of the invention is applied. As shown, the heart of the system is provided by a central module (hereinafter abbreviated as CM) 100 which is connected to front-end modules (hereinafter abbreviated as FM's) 201 to 208 via highways 220 to 223 and 230 to 233. The CM 100 is of a self-routing channel type which has no processor. In FIG. 1, the FM's 201 to 204 each provided with an SM (subscriber module) have subscriber interfaces and the FM's 205 to 208 each provided with a TM (trunk module) have trunk interfaces. Thus, the above configuration generally provides an exchange. For example, communication information coming from a subscriber line 210 is combined with a destination address at the FM 201 and sent to the CM 100 via the inter-module highway 220. Fundamentally, the CM 100 has a space switch function and looks up the address described in the header. If the destination address is for the FM 207, the CM 100 switches to the inter-module highway 232. The FM 207 then transmits the communication information to a trunk line 242. Communication from the trunk line side to the subscriber line side is effected in a similar way. Since ordinary communications of, for example, telephone voice is bidirectional, a pair of up-signal modules, for example, from FM 201 to FM 207 and down-signal modules, for example, from FM 205 to FM 203 are used in combination. The number of FM's involved and the ratio between the number of SM's and the number of TM's included in the FM's are determined in accordance with a situation in which the system is placed. If the FM's are all used as TM's, the system of course serves as a trunk exchange. It should be understood that the TM's having trunk interfaces need not always be distributed and they may be concentrated near the CM as illustrated in FIG. 1.

The switching system of FIG. 1 will be described in greater detail with reference to FIG. 2. The FM as represented by FM 201 comprises a time switch 251, a link interface 252, a control system 253 and a status managing memory 250. Time-division multiplexed communication information issued from a subscriber is inputted to the FM (SM) via a subscriber line and a multiplexer stage, not shown. Under the direction of the control system 253, the time switch 251 rearranges the time-division multiplexed information in accordance with destination modules. The link interface 252 sets up blocks each of which is appended to a header indicative of a destination address and the like to accommodate communication information destined for the same peripheral module. These blocks are carried on time slots and sent to the CM 100.

The CM 100 comprises link interfaces $16_1$ to $16_n$, time switches $11_1$ to $11_n$, a channel match logic circuit 102, a space switch 103 and time switches $17_1$ to $17_n$. The headers of the blocks sent from the FM 201 are read by the link interface $16_1$. The channel match logic circuit 102 looks up header information associated with each of the blocks sent from individual FM's so as to generate addresses which are used for reading or writing the individual time switches $11_1$ to $11_n$ in such a manner that a plurality of blocks destined for the same peripheral module can be prevented from coexisting at a time. This operation can be achieved using wired logics only. The time switches $11_1$ to $11_n$ respond to the addresses generated from the channel match logic to perform rearrangement of the blocks. Since the rearrangement is directed to perfect avoidance of collision of a block with another within one frame, that is, to establishment of a non-block condition, the output links of the time switches $11_1$ to $11_n$ are operated at a speed which is twice as high as an operation speed of the input links. The space switch 103 performs switching in accordance with destination addresses described in the headers associated with respective blocks and sends blocks to one of the time switches $17_1$ to $17_n$ which is connected to a destined FM. The one of the time switches $17_1$ to $17_n$ recovers the original operation speed and transmits the blocks to a highway connected to the destined FM.

The FM as represented by FM 208 comprises a link interface 262, a time switch 261, a control system 263 and a status managing memory 260. The blocks sent from the CM 100 are separated from the headers by means of the link interface 262, and the communication information is written in the time switch 261 in accordance with an address which the control system 263 designates on the basis of information described in the header and is again time-division multiplexed so as to be transmitted to a trunk line.

Figure 3:
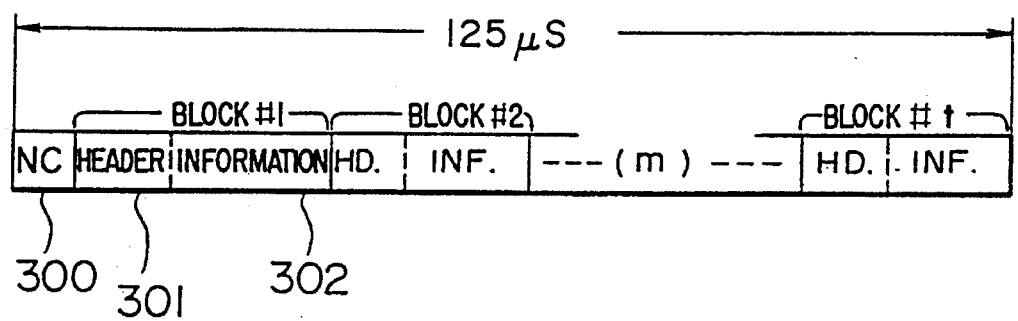
FIG. 3 is a diagram for explaining an example of a frame format according to the invention.

FIG. 3 illustrates a frame format on each of the inter-module highways 220 to 223 and 230 to 233. The frame has a length of, for example, 125 μs which is divided into t blocks of fixed length. The frame is headed with a field 300 on which the number of blocks allocated to circuit switching information such as voice and the like requiring real-time base processing is recorded in accordance with individual outgoing highways for which the blocks are destined. Each block is comprised of a header 301 and an information field 302.

Figure 4:
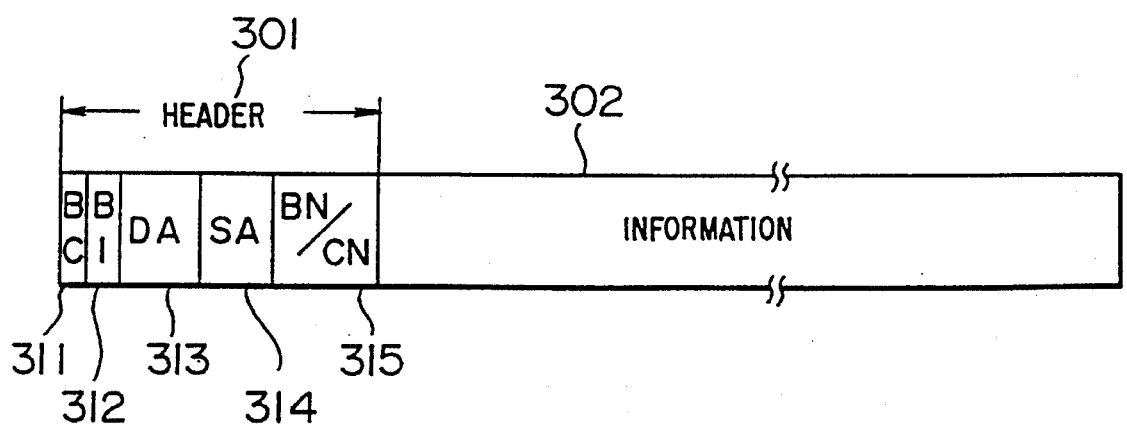
FIG. 4 details a block in the FIG. 3 frame.

FIG. 4 details a format of one block. The header 301 consists of five areas 311 to 315. FIG. 5 shows contents of each area.

More particularly, data indicative of idle or busy is set in a BC area 311, information indicative of the kind of switching or call control information is set in a BI area 312, a receiving FM number is set in a DA area 313, a sending FM number is set in an SA area 314, and a block number used for a circuit switching call or a call reference number used for a store and forward switching call is set in a BN/CN area 315.

The information field 302 has a length of about several of tens of bytes, for example. The CM 100 relies on only hardware to perform switching on the basis of information described in the header 301.

The number of blocks constituting one physical frame can be determined in a manner to be described below. It is presupposed that n FM's each accommodating c circuits at the most are involved on either side of the CM, and that the header 301 and the information field 302 of one block are of h bytes and i bytes, respectively. On the above assumption, the number t of blocks within one frame is so determined as to meet the following condition. The necessary condition prescribes that the number of blocks should not be deficient even when information is sent from a sending FM to (n−1) receiving FM's excepting one receiving FM under the worst efficiency condition in which information for only one voice circuit (amounting to one byte) is sent to all of the (n−1) receiving FM's and the remainder of information for {c−(n−1)} circuits is sent from the sending FM so as to be concentrated on the one receiving FM. In terms of a formula, the above necessary condition is expressed as, $$t \geq (n-1) + \frac{c-(n-1)}{i} . \quad (1)$$

When this condition is satisfied, a status never occurs wherein, in spite of the presence of idle circuit or circuits, the information can not be transmitted because of a deficiency in the number of blocks.

On the other hand, thanks to the addition of the header, the overhead o of an inter-module highway can be expressed as, $$o = \frac{t \cdot (h+i)}{c} . \quad (2)$$

Equation (1) indicates that the longer the length i of the information field, the smaller the number t of requisite blocks becomes and equation (2) on the other hand indicates that as either of i and t increases, the overhead o is increased. Accordingly, there exists an optimum value of either of i and t which can minimize the overhead o and the optimum value can result from a trade-off between equations (1) and (2).

By determining the number of blocks in this manner, a block necessary for an FM to communicate can be retained without fail as far as that FM has an idle circuit. Consequently, the FM need not monitor the idle/busy status of a block and can perform resource management by solely monitoring the idle/busy status of the circuit.

The construction of each of the FM's 201 to 208 shown in FIG. 1 will now be described in greater detail.

In the following description, a call typically represented by telephone voice, of which periodicity and real-time base processing are required, will be referred to as a circuit switching call, and a call, which has no perodicity but has a so-called burst property and which does not stringently require the real-time base processing, will be referred to as a storage switching call. The meaning of these calls is not coincident with that of calls handled by the existing circuit exchange and packet exchange and is not limited thereto.

Figure 6:
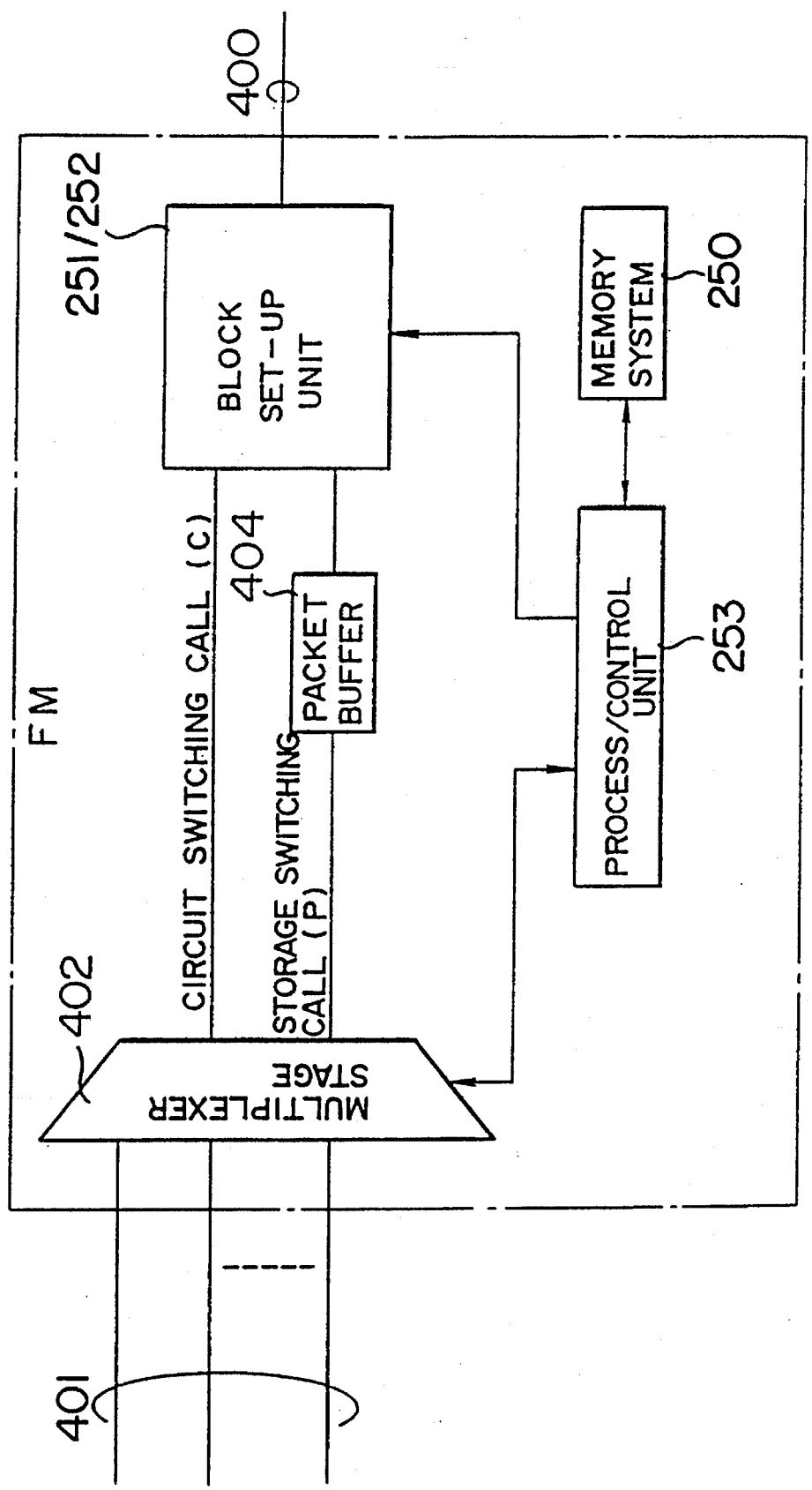
FIG. 6 is a block diagram illustrating an example of a front-end module in the FIG. 1 system.

Fundamentally, the FM comprises, as shown in FIG. 6, a multiplexer stage 402, a block set-up unit 403, a packet buffer 404, a process/control system 405 and a memory system 406. The process/control system 405 corresponds to the control system 253 of FIG. 2 and the memory system 406 similarly corresponds to the memory 250. The block set-up unit 403 corresponds to the time switch 251 and link interface 252 in combination. The FM has input/output lines as represented by an inter-module highway 400 and a subscriber or trunk line 401 and the direction of the input/output lines depends on whether the FM is located on the transmitting side or on the receiving side.

A signal coming from the subscriber or trunk line 401 passes through the multiplexer stage 402 so as to be inputted to the block set-up unit 403 directly in the case of a circuit switching call (C) or via the buffer 404 in the case of a storage switching call (P). At the block set-up unit 403, communicated information is accommodated in blocks in a manner to be described later and then transmitted to the inter-module highway 400. All of information necessary for switching processing (various kinds of translation information, resource managing information and the like information) are stored in the memory system 406, and the process/control system 405 having a processor performs a switching function typically including call control.

Figure 7:
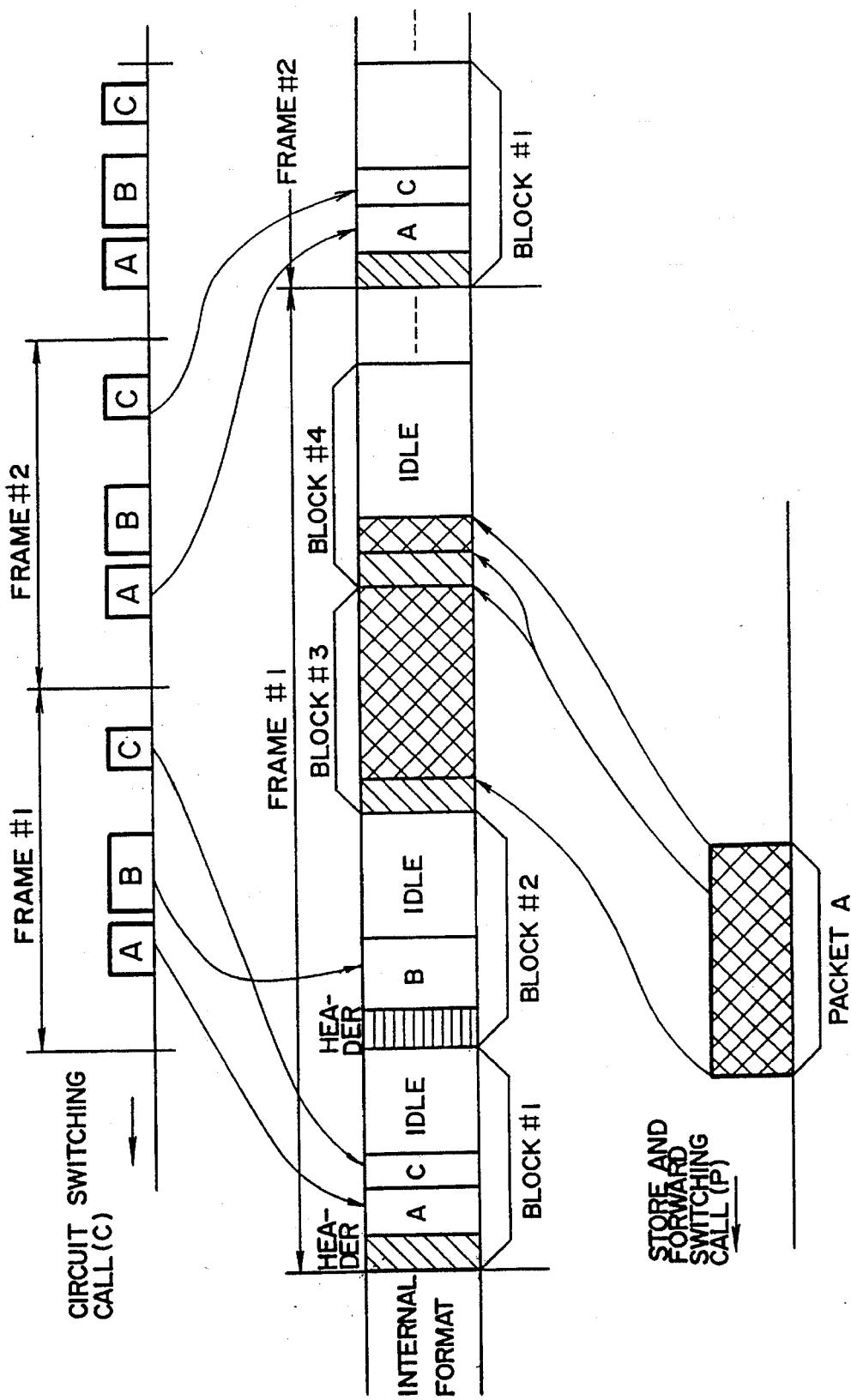
FIG. 7 is a diagram useful in explaining the operation of block set-up in the FIG. 6 front-end module.

A circuit switching call can be accommodated in blocks in a manner as will be described below with reference to FIG. 7 which is illustrative of block set-up operations.

In the case of a circuit switching call (C), communication information of the same information amount occurs periodically. For example, in PCM coded voice, 8 bits of information occur every 125 μs. Accordingly, desired one block, for example, block No. 2 may be selected for one circuit call, for example, B and destination and communication information of the one circuit call may be accommodated in the header and information field of the block No. 2. The term "destination" herein corresponds to a destination outgoing highway, i.e., a receiving FM number. Once a block has been selected, the location of the selected block is invariably used every period, i.e., every physical frame. If the amount of communication information occurring every period is too large to be accommodated in one block, two or more blocks may be used. Conversely, if communication information for one circuit call is accommodated in one block leaving behind a space area, communication information for a plurality of circuit calls having the same destination, for example, circuit calls A and B may be accommodated in the information field of the same block, for example, block No. 1.

A switching call which has the varying amount of information occurring every period is not treated as the circuit switching call but is treated as a storage switching call to be described below.

A storage switching call (P) does not stringently require the real-time base processing, as compared to the circuit switching call. Therefore, the circuit switching call (C) has a preference in accommodating information in the block. Thus, blocks are initially allocated to the circuit switching call (c) and thereafter, the remaining unoccupied blocks are used to accommodate the storage switching call (p). Since the number of calls within the circuit switching call and the amount of information for each circuit call are not fixed when measured over a long period of time, the amount of communication information for a storage switching call which can be accommodated in the block and transmitted at a time point is not fixed. Accordingly, for waiting for packets typically used in storage switching, a FIFO buffer (packet buffer 404 shown in FIG. 6) is provided.

Since the storage switching call (P) does away with the concept of frame, packets are sequentially accommodated, beginning with the leading packet in the FIFO buffer, in the information field of an idle block, for example, block No. 3 which remains unoccupied after the allotment of the circuit calls to blocks, so that communication information for the packet, inclusive of such information as a packet header added pursuant to the protocol, can be accommodated in the block No. 3. If the length of one packet exceeds the length of the information field of one block, the one packet may be divided so as to be accommodated in a plurality of blocks, for example, blocks Nos. 3 and 4. In this case, the header of each block is of course described with the same destination.

In the case of the storage switching call, a plurality of calls will not be contained in one block. Thus, even when the length of one packet is shorter than the length of the information field of one block and even when one packet is divided so as to be accommodated in a plurality of blocks and a block accommodating the final division of that packet has the information field which is almost unoccupied, another storage switching call of the same destination can not be accommodated in the same block together with that packet. The block for accommodating the storage switching call is not always located at the same position in each frame. For example, when a circuit switching call ends and a block which has been dedicated to the circuit switching call becomes unoccupied, this block is used, in the subsequent frame, for accommodating a storage switching call being stored in the FIFO buffer at that time point.

Figure 8:
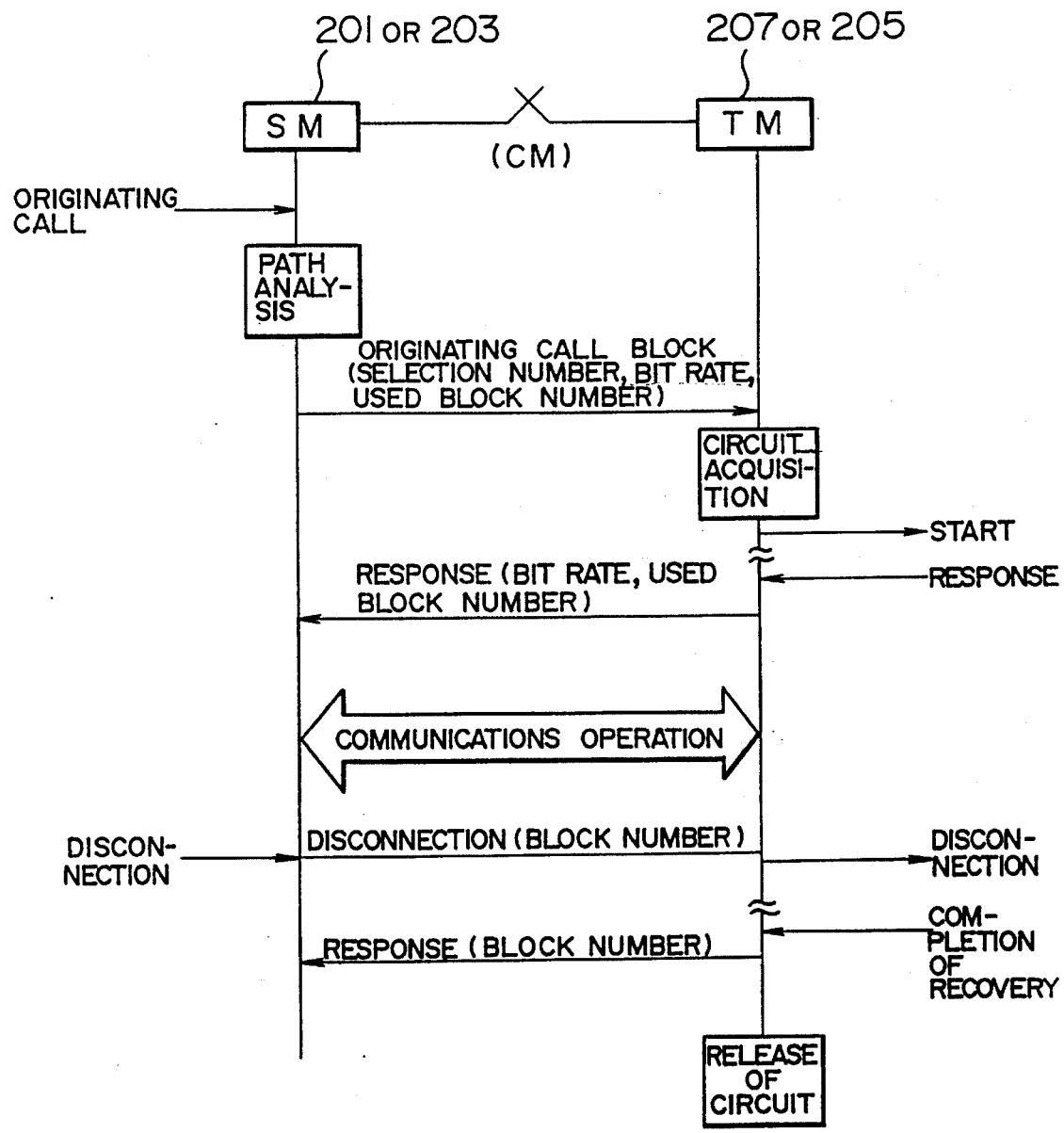
FIG. 8 is a diagram useful in explaining the sequence of call control.

As regards the circuit switching call, circuit calls must be switched with a minimized predetermined delay time. In this embodiment, when a call is originated, a channel path is set and a block number to be used every period is initially retained in the following manner. More particularly, as shown in FIG. 8, when an SM (one of the FM's 201 to 204 in FIG. 1), for example, SM 201 detects an originating call, it determines a route by analyzing a selection number such as a dial number. Since a determined outgoing route is generally accommodates a plurality of TM's 205 to 208 shown in FIG. 1, desired one, for example, TM 207 is selected among them.

Various kinds of selection algorithm are conceivable. Especially, considering that the FM's on transmitting side do not communicate with each other, desirable algorithm is such that different FM's on the transmitting side preferably select different FM's on the receiving side. Thus, determination of the algorithm depends on a situation in which the system is placed. For example, especially where a specified SM frequently communicates through a specified path, the specified SM may always select a specified TM and the other SM's must not select the specified TM.

After selection of the TM 207, a call set-up signal is sent to the TM 207. This may be done using a call control information block in this embodiment, though another signal line may otherwise be used. Described in the information field of this block are a selection number, a signal speed and a used block number. By consulting the information, the TM 207 can recognize which block corresponds to the originating call and how many and which bits of information in the corresponding block correspond to the originating call. If a plurality of calls are contained in one block, the TM 207 can also recognize which call corresponds to that originating call and how many and which bits of information in the corresponding call correspond to that originating call. It should be noted herein that as algorithm for accommodating a plurality of calls destined for the same path in one block in order to minimize the overhead of the header, a kind of generally called group switching may be used.

In the TM 207 being in receipt of the originating call signal, the process/control system 405 shown in FIG. 6 looks up the status managing memory such as 260 in FIG. 2 included in the memory system 406 to determine the idle/busy status of circuits accommodated in the TM 207. If the status is idle, one of the idle circuits is acquired, the circuit status managing memory 260 is rewritten and thereafter a response signal is returned. The response signal is transmitted from a transmitting TM, for example, TM 205 in FIG. 1 which is paired with the receiving TM 207, by using a call control information block and is received by an SM, for example, SM 203 which is paired with the transmitting SM 201. Described in the response signal are a used block number and a signal speed. The reception of the response signal by the SM 203 completes the path setting.

In this manner, each of the FM's 201 to 208 in FIG. 1 can acquire a circuit and retain a block used for communications without assistance of the CM 100 in FIG. 1 by merely monitoring the status of circuits accommodated in each FM, determining the idle/busy status and indicating a result of the decision.

In contrast to the circuit switching call, storage is permitted for the storage switching call. Accordingly, the acquisition of an outgoing circuit is not always required and the path setting as needed for the circuit switching call is not performed precedently.

The FM applies protocol procedures necessary for packet switching processing to packets coming from the subscriber line or trunk line, and thereafter accommodates the packets in unoccupied blocks in sequence of arrival and performs the switching operation, as described previously.

When unoccupied blocks are acquired, storage of packets is effected by, for example, a transmitting FM. When an outgoing circuit is acquired, storage of packets is effected by, for example, a receiving FM.

As described above, the number of blocks for accommodating the communication information for the storage switching call and the position of the blocks within a frame are variable. However, communication information for a plurality of calls is not accommodated in one block. Accordingly, in place of the used block number described in the header of a block in the case of the circuit switching call, a call number for distinguishing calls from each other is described in the header in the case of the storage switching call. Thanks to the channel match logic circuit to be detailed later, when a pair of transmitting and receiving FM's are viewed, the sequence of blocks transmitted and received between the paired FM's is not rearranged.

Figure 9:
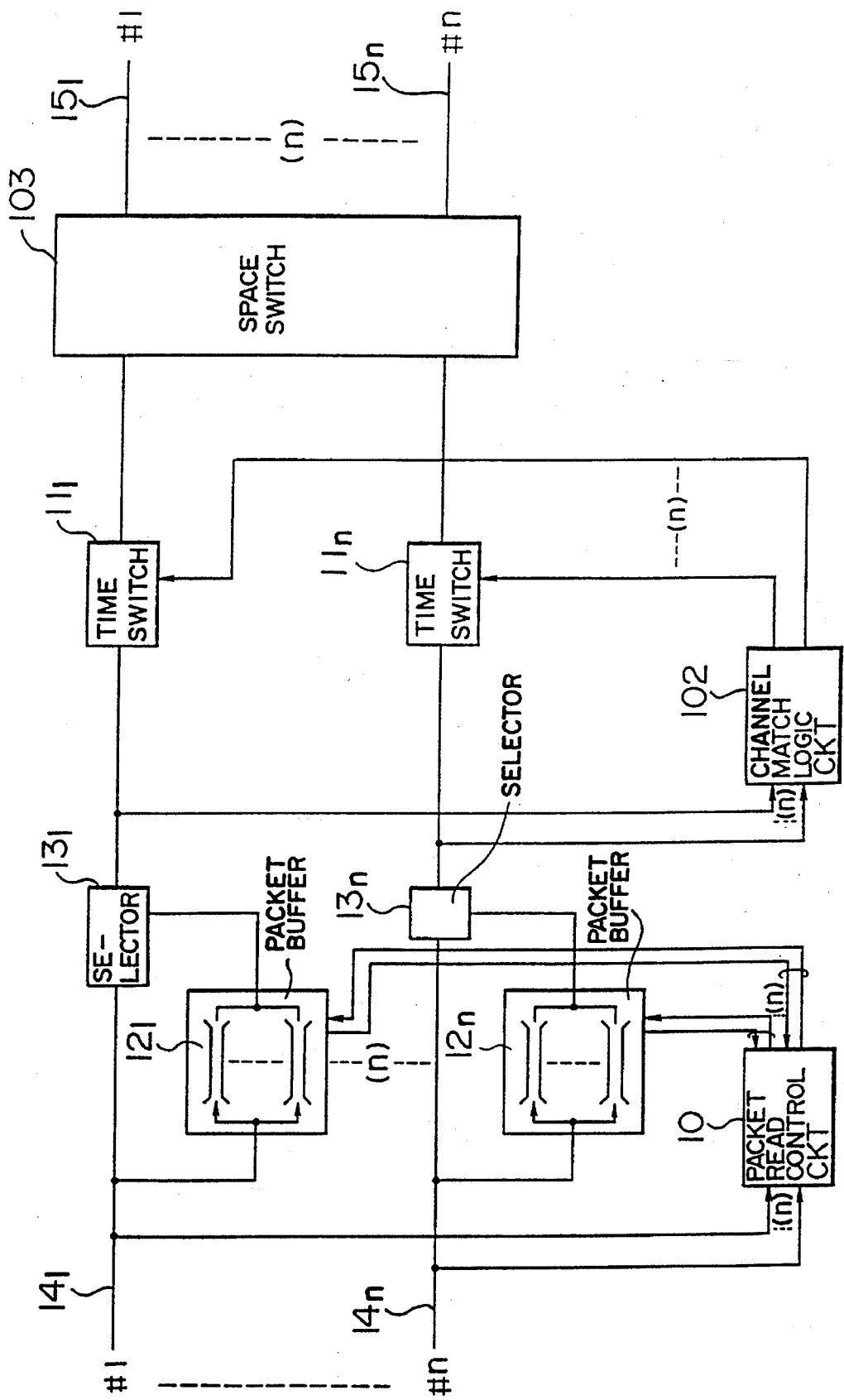
FIG. 9 is a block diagram illustrating a first embodiment of a central module according to the invention.

FIG. 9 illustrates a fundamental configuration of the CM 100 shown in FIG. 1 which is the key part of the present system. In association with n FM's on the transmitting side, not shown, and n inter-module highways $14_1$ to $14_n$, n time switches $11_1$ to $11_n$ are provided. The outputs of the time switches are connected to n inputs of space switch 103, the space switch 103 having n outputs respectively connected to n FM's on the receiving side, not shown, via n inter-module highways $15_1$ to $15_n$.

Selectors $13_1$ to $13_n$ are adapted to selectively transmit circuit switching call blocks and storage switching call blocks in such a manner that the former blocks are directly connected to the time switch $11_1$ to $11_n$, respectively, and the latter blocks are connected thereto via packet buffers $12_1$ to $12_n$.

Each of the packet buffers $12_1$ to $12_n$ is controlled by a packet read control logic circuit 101. Each of the time switches $11_1$ to $11_n$ is controlled by the channel match logic circuit 102. Either of the packet read control logic circuit 101 and channel match logic circuit 102 may be realized with wired logic.

The space switch 103 is a so-called self-routing switch which performs self-controlled switching in accordance with a destination address described in the header of each block and it may take various configurations of which one is exemplified in FIG. 10. The configuration shown in FIG. 10 is simple wherein selectors $51_1$ to $51_n$ are provided in association with individual destination FM's, and switching address generation circuits $52_1$ to $52_n$ responsive to the header information generate switching addresses used to switch the selectors $51_1$ to $51_n$. Selection by the selectors $51_1$ to $51_n$ can be performed in timed relationship with the addresses from the circuits $52_1$ to $52_n$ by means of re-timing circuits $50_1$ to $50_n$.

Fundamentally, the CM has the above space switch function. With the simple space switch, however, the CM becomes unable to switch when receiving blocks having the same destination from a plurality of different FM's at a time. The time switches $11_1$ to $11_n$ are adapted to rearrange time positions of the blocks in such an event. The time switches $11_1$ to $11_n$ are controlled by the channel match logic circuit 102 which will be detailed below.

Figure 11:
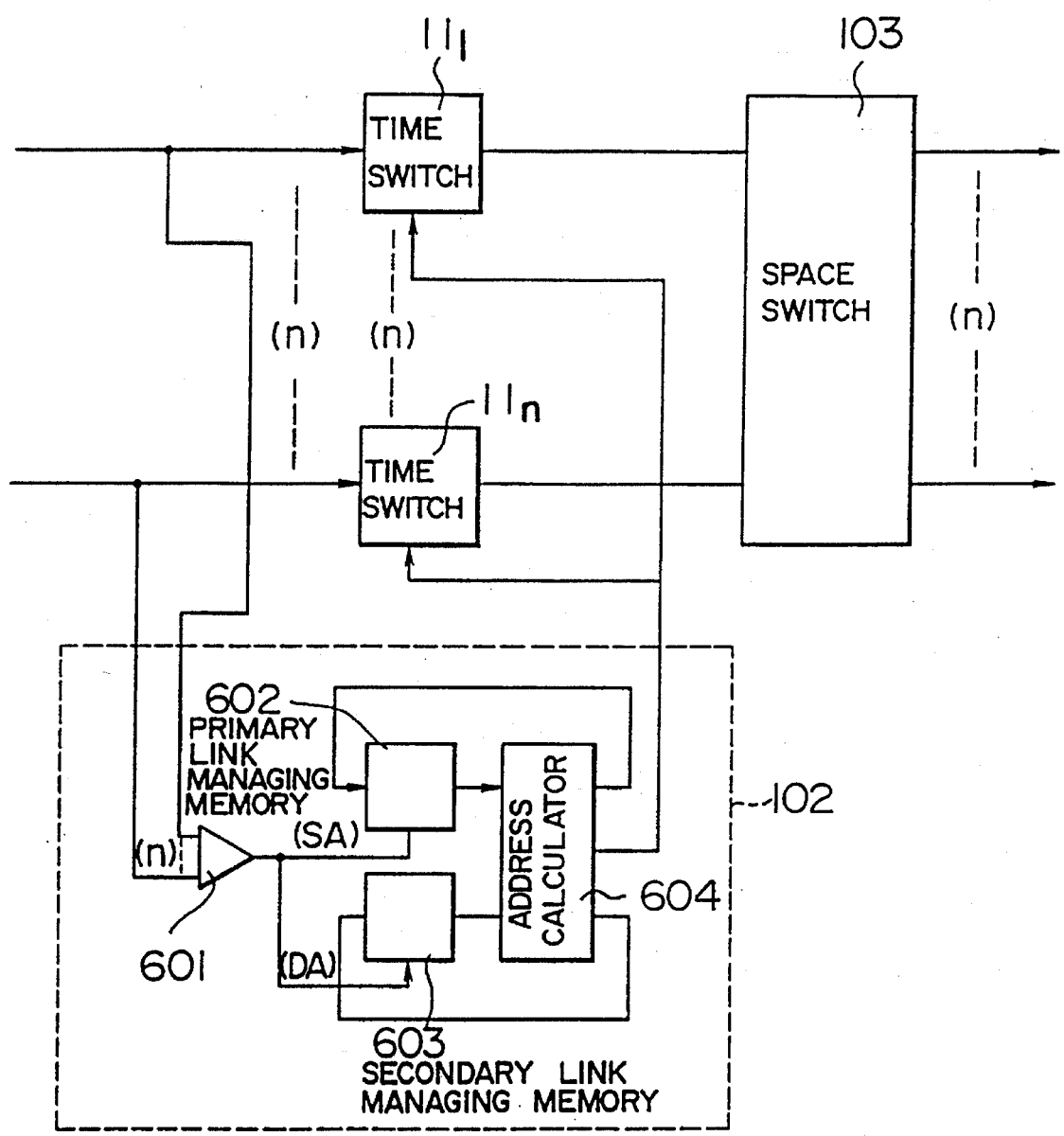
FIG. 11 is a block diagram of a channel match logic circuit shown in FIG. 9.

The channel match logic circuit is illustrated in block form in FIG. 11 along with the time switches $11_1$ to $11_n$ and space switch 103 which have been explained with reference to FIG. 9.

The channel match logic circuit 102 comprises an address multiplexer 601, a primary link managing memory 602, a secondary link managing memory 603 and an address calculator 604. The "primary link" referred to herein corresponds to the incoming link of the space switch 103 and the "secondary link" to the outgoing link of the space switch 103.

The headers (301 in FIGS. 3 and 4) of information transmitted through the highways are read in advance of the time switches $11_1$ to $11_n$ and multiplexed at the address multiplexer 601. Of the contents of the header, the sending address 314 in FIG. 4 is used to read the primary link managing memory 602 and the destination address 313 in FIG. 4 is used to read the secondary link managing memory 603. The idle/busy status of each block on the primary link is written in the primary link managing memory 602 in association with the respective FM's and the idle/busy status of each block on the secondary link is written in the secondary link managing memory 603 in association with the respective FM's.

To set up non-block channels, the operation speed of the space switch 103 is doubled. As a result, the number of blocks prevailing in the space switch is twice the number of incoming blocks inputted at a cycle of one frame.

With the above construction, it is possible to know which block on either of the primary link and the secondary link is idle at a time point within a frame.

Figure 12:
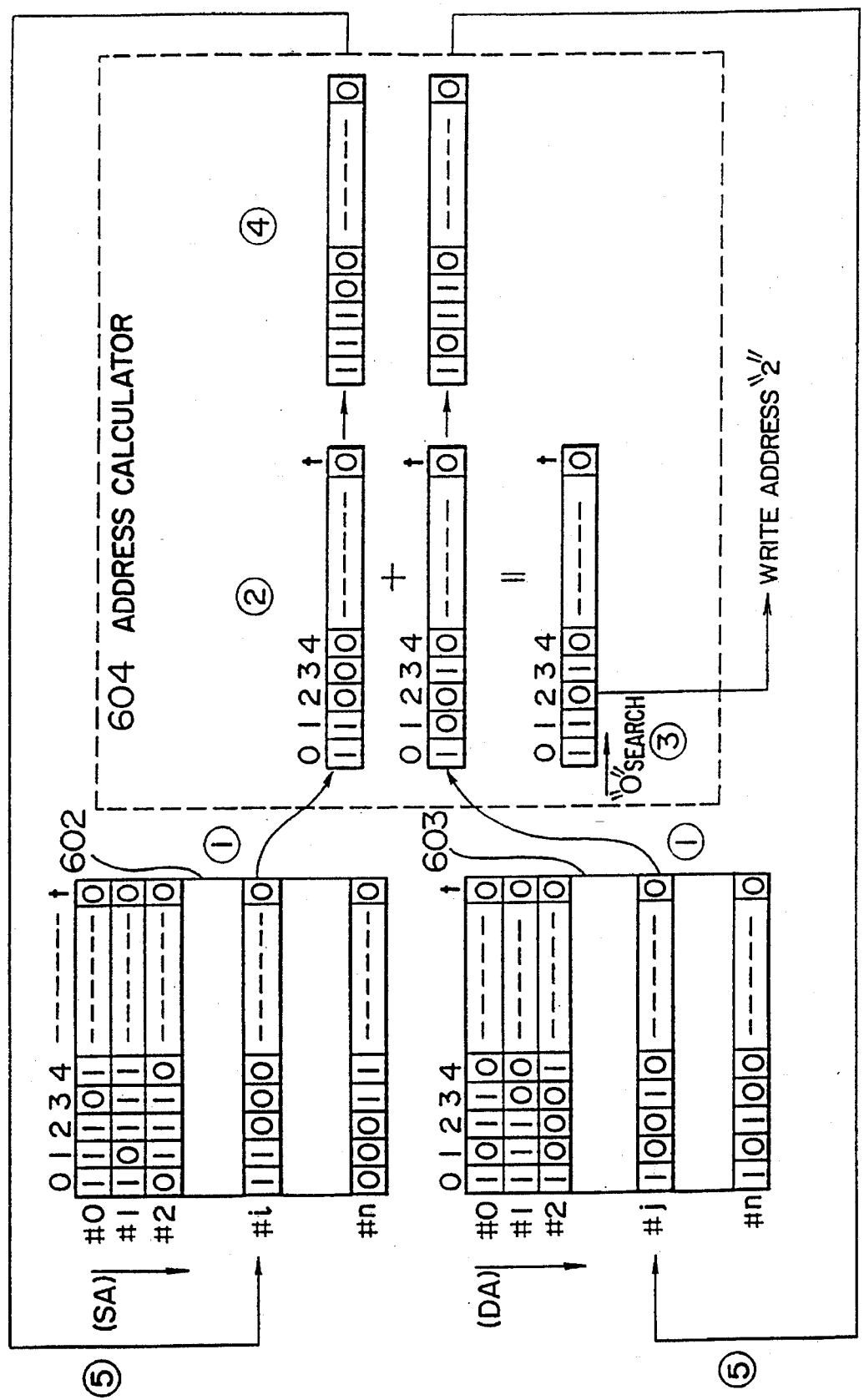
FIG. 12 is a diagram for explaining the operation of the FIG. 11 logic circuit.

For more details, reference should be made to FIG. 12. Blocks coming from an i-th incoming FM are seen from FIG. 12 as destined for a j-th outgoing FM with "1" indicating a busy block and "0" indicating an idle block.

① The address calculator 604 responds to an i-th sending address and a j-th destination address to read the contents of the primary link managing memory 602 and secondary link managing memory 603.

② The read two contents of the memories are ORed to determine idle blocks common to the two links.

③ An address of an idle block in the closest positional relationship with the heading block within the frame is used as a write address to be written in the time switch.

④ At the used position, "0" is rewritten to "1".

⑤ And this information ("0" or "1") is fedback to the primary link managing memory 602 and secondary link managing memory 603.

In this manner, the incoming blocks are random-written in each of the time switches $11_1$ to $11_n$ on the basis of the write address and concurrently the primary link managing memory 602 and secondary link managing memory 603 are rewritten until a processing for one frame has been completed. Thereafter, the time switches are sequentially read and the blocks thus read are sent to the space switch 103, thereby ensuring that the blocks can be prevented from colliding with each other within the space switch 103. In the foregoing description, the time switches $11_1$ to $11_n$ are assumed to be of a so-called double buffer configuration having a write surface and a read surface which are used alternately. Further, in place of random-write and sequential read as described, sequential write and random-read may be used to obtain a configuration which functions similarly.

The circuit switching call can conveniently be controlled by the channel match logic circuit as described previously. In the case of the circuit switching call, the path setting is initially effected to retain the outgoing circuits as described above and therefore there is no possibility that blocks will arrive having the same destination which exceed the circuits in number. Accordingly, the sequence of blocks can be rearranged within a frame without fail.

In the case of the storage switching call, on the other hand, no path setting is effected prior to communications and communication information for the storage switching call is accommodated in the idle blocks unoccupied by the circuit switching call as much as possible for the idle blocks to accommodate. This leads to the fact that calls of the same desination possibly may be allocated unlimitedly to idle blocks so long as such idle blocks exist and it is impossible for the calls to be rearranged perfectly within one frame so as to prevent them from colliding with each other. The channel match logic circuit, however, can execute only operations in a unit of a frame. To cope with this problem, as shown in FIG. 9, there are provided the packet buffers $12_1$ to $12_n$ and the packet buffer read control logic circuit 101.

The packet buffers $12_1$ to $12_n$ will now be n detailed with reference to FIG. 13 and the packet buffer read control logic circuit 101 with reference to FIG. 14.

It is assumed in FIG. 13 that blocks accommodating a packet switching call appear on, for example, the first incoming highway 141 and arrive at a register 701 and a selector 131. When recognizing from the header information for the blocks that the blocks are for the storage switching call, the register 701 switches the connection of the selector 131 to a packet buffer side 121 and issues a signal $\overline{C}$ to the effect that the current switching call is not a circuit switching call.

The register 701 reads a destination address DA in the header. A distributor 702 is set in accordance with the destination address DA so that the blocks are stored in one of buffers $71_1$ to $71_n$ which corresponds to or is associated with the destination address.

The destination address DA is on the other hand decoded by a decoder 703 and used to count up one of up/down counters $72_1$ to $72_n$ which corresponds to or is associated with the aforementioned buffer. Thus, the up/down counters $72_1$ to $72_n$ count the number of blocks stored in the buffer $71_1$ to $71_n$, respectively. The stored block number is supplied to a priority logic circuit 704 via respective gates $73_1$ to $73_n$. The function of the gates $73_1$ to $73_n$ will be described later.

The priority logic circuit 704 delivers a counter number, that is, a number indicative of a buffer which stores the maximum stored block number among inputted n stored block numbers. The maximum number is decoded by a decoder 705 which is operated in timed relationship with the signal $\overline{C}$ to issue a read clock RCK to only the buffer selected by the signal $\overline{C}$. In accordance with the read clock RCK, that buffer storing the blocks the number of which is maximal at that time point is read. The selector 131 is also activated by the signal $\overline{C}$ to send the blocks read out of the buffer to the time switch $11_1$. Concurrently, the read clock RCK counts down the up/down counter in question selected among the up/down counters $72_1$ to $72_n$. The read clock RCK also counts the contents of selected one of counters $74_1$ to $74_n$. Each of the counters $74_1$ to $74_n$ counts the number CNT of blocks actually read from each of the corresponding or associated buffers $71_1$ to $71_n$. The counters $74_1$ to $74_n$ are reset by a reset signal RST in synchronism with the heading of a frame.

The priority logic circuit 704 is employed herein for illustration purpose only and conceivably, the same function may be achieved in various ways including a simple way to select buffers according to a sequence of numbers and a way to select buffers on the basis of random numbers.

Figure 14:
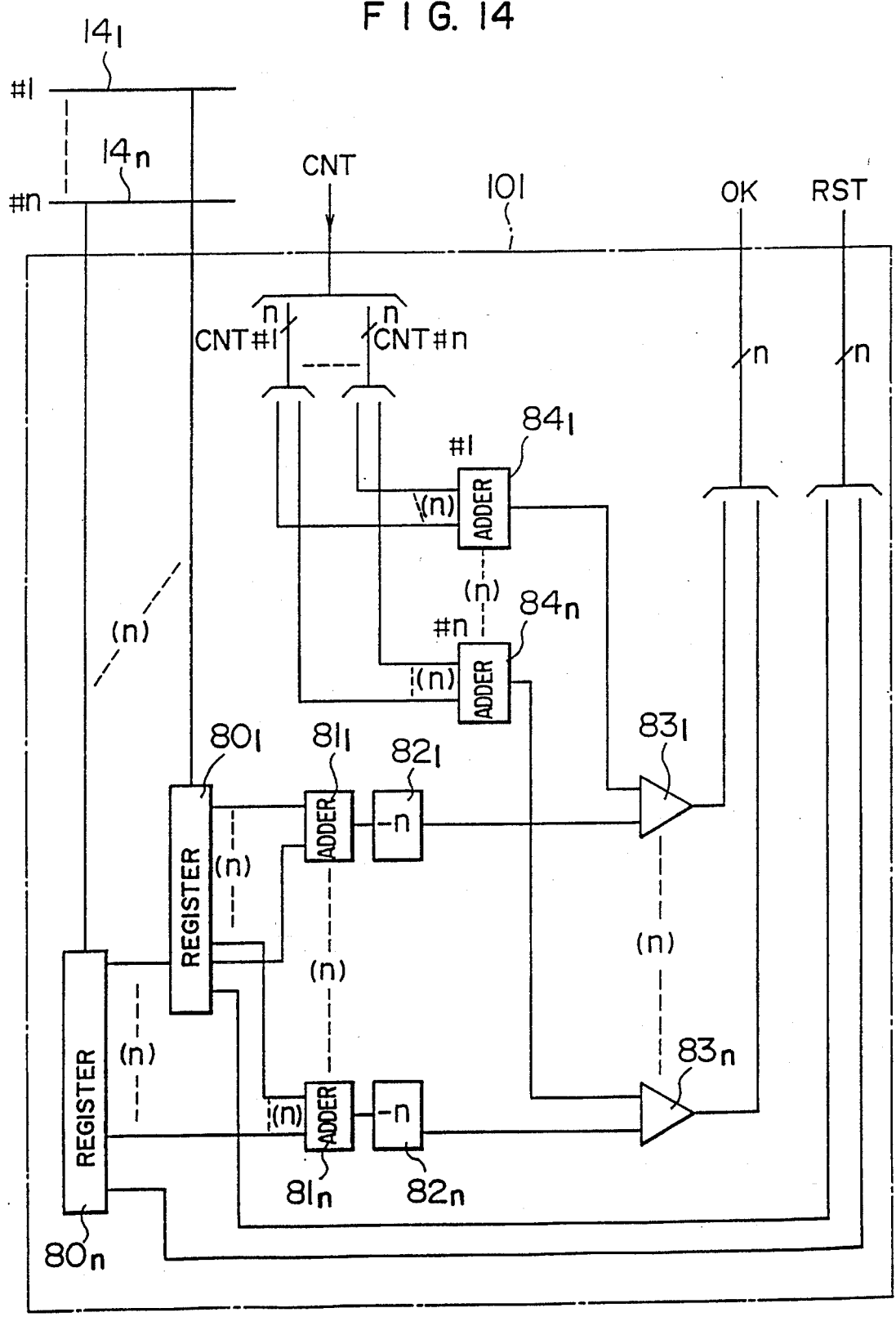
FIG. 14 is a block diagram of a packet buffer read control logic circuit shown in FIG. 9.

Turning to FIG. 14, each of the registers $80_1$ to $80_n$ detects the heading of a frame on each of incoming highways $14_1$ to $14_n$ to produce the reset signal RST and fetches the number of blocks for circuit switching call, which follow the heading and which are destined for each destination outgoing highway, into respective adders $81_1$ to $81_n$ in accordance with respective destinations. The adders $18_1$ to $18_n$ are provided in association with the destination outgoing highways, respectively. Each of the adders $81_1$ to $81_n$ adds together the number of the blocks for circuit switching call which come from respective incoming highways and which are destined for the corresponding destination outgoing highway, and besides calculates the permissible number of blocks for store and forward switching call which are destined for respective destinations on the basis of a difference between the sum of the number of the blocks for circuit switching call and the maximum number of blocks which is permitted to be accommodated in the frame. Each of subtracters $82_1$ to $82_n$ constantly subtracts n from a calculated value delivered out of each of the adders $81_1$ to $81_n$. This provides a way to prevent the permissible number from being exceeded even when n packet buffers $12_1$ to $12_n$ request, at a time, blocks for packet switching call which are destined for a specified destination. To this end, various different ways are conceivable including a way to deliver blocks to packet buffers of lower numbers. Each of adders $84_1$ to $84_n$ receives output numbers from the aforementioned counters $74_1$ to $74_n$ which are other counters corresponding to n surfaces of the incoming highways adapted to count the number of blocks which are actually read. Thus, each of the adders $84_1$ to $84_n$ adds together the actual number of blocks which come from respective incoming highways corresponding to each destination outgoing highway.

Each of comparators $83_1$ to $83_n$ compares an output value from each of the subtracters $82_1$ to $82_n$ with an output value from each of the adders $84_1$ to $84_n$. Thus, the comparators $83_1$ to $83_n$ constantly compare the permissible number of blocks for storage switching call within the frame with the number of actually read blocks. When the permissible number is not exceeded, the comparators $83_1$ to $83_n$ produce output signals OK of "1". The gates $73_1$ to $73_n$ shown in FIG. 13 are responsive to the output signals of the comparators $83_1$ to $83_n$ to inhibit the input to the priority logic circuit 704 in respect of a destination number for which the permissible number is exceeded, so that after the inhibition, no block may be read out of a buffer corresponding to the destination in question.

Although in this embodiment the number of blocks for circuit switching call which are destined for respective destination outgoing highways is obtained by reading the specified field using the resistors $80_1$ to $80_n$, the number of blocks may be obtained by counting calls in accordance with individual destinations using the contents of the control information blocks used for call-setting.

As is clear from the foregoing description, either of the packet buffer read control logic circuit 101 and each of the packet buffers $12_1$ to $12_n$ may be realized with wired logic.

In the foregoing, one embodiment of the time-division channel arrangement of the invention has been set forth and it has been described that an integrated switching system can be constructed which is a star-type distributed switching system wherein the CM placed in the heart is surrounded by distributed FM's and which is able to integratedly handle the circuit switching information and the storage switching information. However, the invention is in no way limited to the system according to the embodiment set forth so far.

Second and third embodiments of the integrated switching system capable of integratedly handling circuit switching information and packet switching information will now be described.

The framework of the second embodiment is such that packet buffers corresponding to respective destination FM's are provided in a CM in association with respective incoming FM's and each of the packet buffers is connected to each destination via a bus circuit. In this embodiment, the channel match logic circuit as described in connection with the first embodiment is operated for only the circuit switching information.

The framework of the third embodiment is such that the channel match logic circuit is operated for both the circuit switching information and packet switching information. In the case of packet switching, blocks can not all be rearranged within one frame in some instances. Therefore, in association with respective incoming FM's, buffer memories are provided for accommodating some blocks which have been invalidated for rearrangement. However, in order to process the circuit switching information with priority, a frame has a header field, whereby the number of blocks carrying the circuit switching information is communicated from respective incoming FM's to the channel match logic circuit, thereby making it possible to steadily process the blocks carrying the circuit switching information without resort to buffers.

In the second embodiment, since the packet buffers corresponding to respective destination FM's are provided in association with respective incoming FM's, the packet switching information can be assorted during buffering. Subseqently, the packet switching information in buffers associated with the respective incoming FM's and destined for the same destination is multiplexed by the bus circuit so as to be sent to the same destination FM.

In the third embodiment, the packet switching information is treated in the same manner as the circuit switching information. However, in contrast to the circuit switching information, the packet switching information is not assisted by the preceding acquisition of an idle circuit and in the case of the packet switching information, blocks having the same destination are sometimes concentrated. The channel match logic circuit is effectively operated for the circuit switching information to ensure that blocks destined for the same destination can be rearranged so as not to collide with each other at a time point. In contrast, when in the case of the packet switching information, blocks having the same destination which are concentrated and unlimited in number arrive, there is a possibility that the blocks can not all be rearranged for avoidance of collision within the frame. Since the packet switching information is permitted to be delayed to some extent, blocks invalidated for rearrangement are returned to the buffer so as to be processed during the subsequent frame cycle. The packet call is of a burst-like communication form and a probability that blocks of the same destination are concentrated in sequential frames is low. Therefore, after several repetitions of the above returning operation, the procedure can be advanced.

Figure 15:
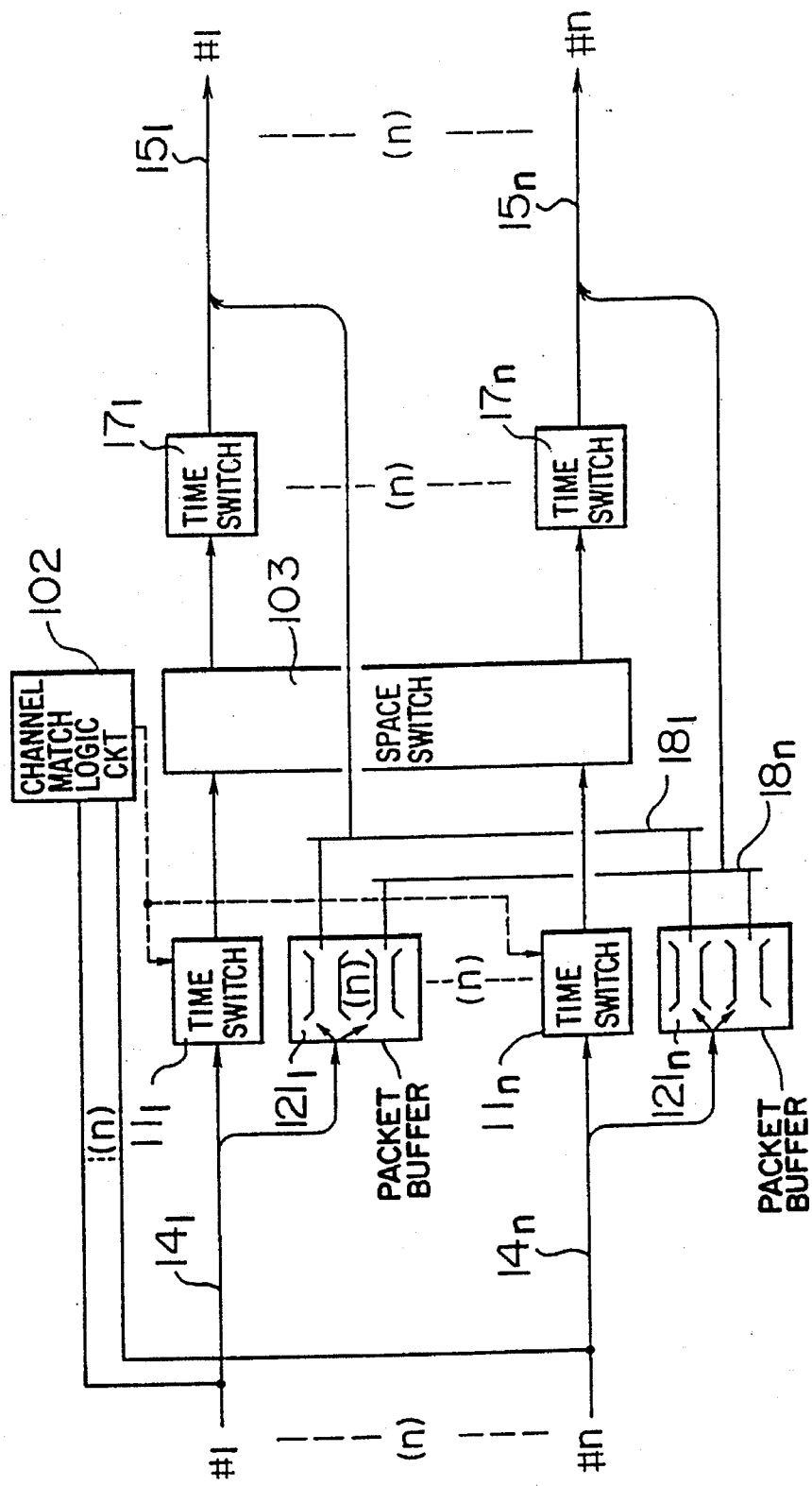
FIG. 15 is a block diagram illustrating a second embodiment of the central module according to the invention.

FIG. 15 illustrates a second embodiment of a circuit/packet integrated channel arrangement. This arrangement corresponds to FIG. 9 illustrating, in block form, the arrangement of the CM according to the first embodiment. The integrated channel arrangement of the second embodiment comprises time switches $11_1$ to $11_n$, packet buffers $121_1$ to $121_n$, bus circuits $18_1$ to $18_n$, a channel match logic circuit 102, a space switch 103, and time switches (speed conversion buffers) $17_1$ to $17_n$. When blocks each having a header described with destination FM number and indication for distinction between circuit switching and packet switching as well as information arrive at the CM via one of incoming highways $14_1$ to $14_n$, for example the first highway $14_1$, circuit switching information and packet switching information are distributed to the time switch $11_1$ and the packet buffer $121_1$, respectively. Switching for the circuit switching information has already been described. The packet buffer $121_1$ has destination branches and the incoming blocks are subjected to buffering in accordance with the destinations. The above distribution is effected for each highway and blocks in the respective buffers destined for the same destination are multiplexed by the corresponding one of the bus circuits $18_1$ to $18_n$. A multiplexed signal is carried on idle time slots, unoccupied with circuit switching information, on one of the outgoing highways $15_1$ to $15_n$. In this embodiment, the circuit switching information passes through the space switch and the packet switching information passes by the bus circuits. With the relatively simplified logical circuits, the multiplexed packet switching information can be transmitted to the outgoing highway with high efficiency.

Figure 16:
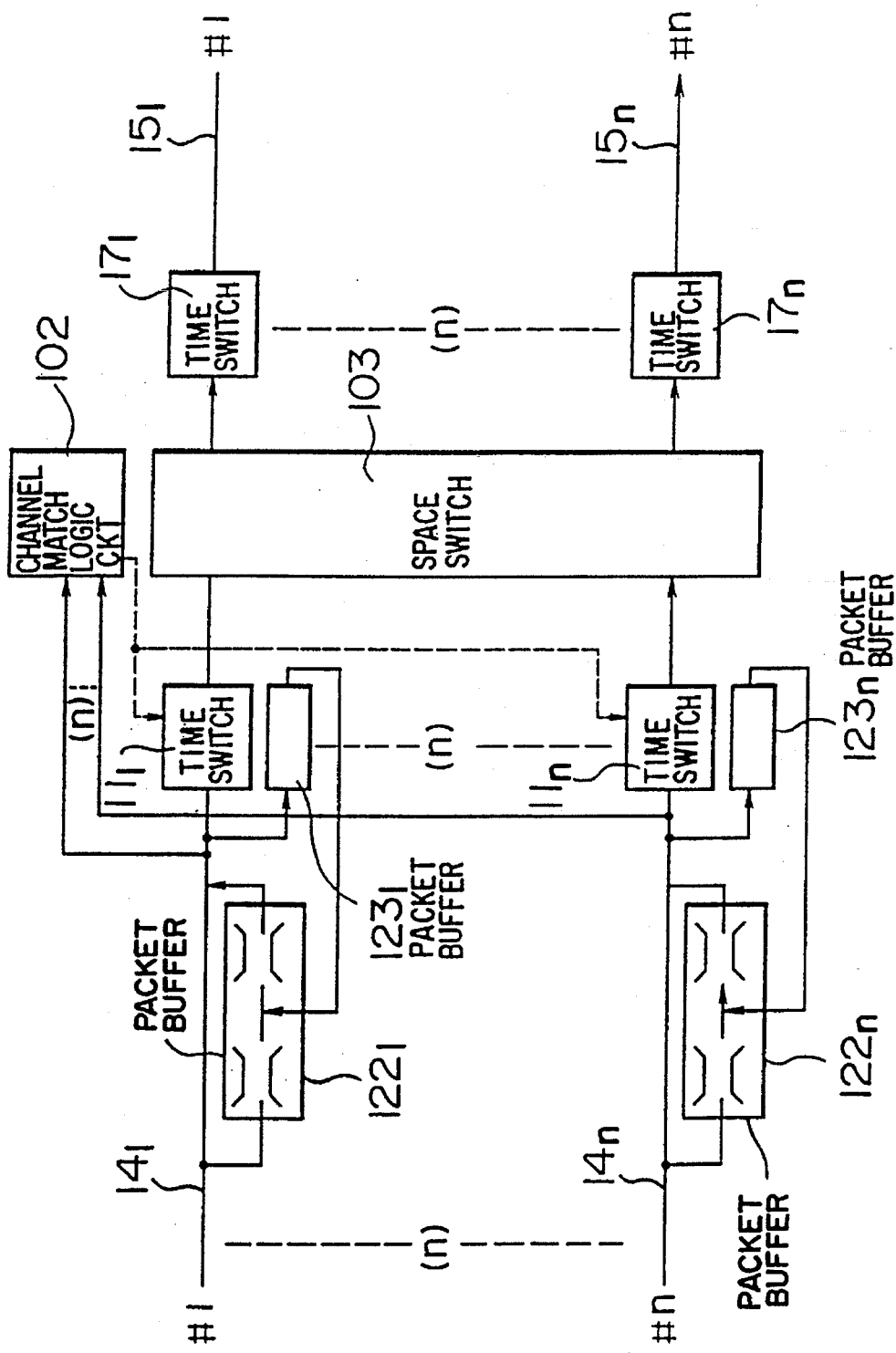
FIG. 16 is a block diagram illustrating a third embodiment of the central module according to the invention.

Turning to FIG. 16, a third embodiment of a circuit/packet integrated channel arrangement will now be described. Particularly, FIG. 16 illustrates, in block form, a CM arrangement as in the case of FIGS. 9 and 15. In this embodiment, first packet buffers $122_1$ to $122_n$ and second packet buffers $123_1$ to $123_n$ substitute for the packet buffers $121_1$ to $121_n$ and bus circuits $18_1$ to $18_n$ of FIG. 15. As in the case of the FIG. 9 embodiment, blocks carrying packet switching information, like blocks for circuit switching information, are subjected to switching by means of time switches $11_1$ to $11_n$ and a space switch 103. Due to the fact that the circuit switching information is preferentially processed and so the packet switching information is sometimes required to be delayed, the first packet buffers $122_1$ to $122_n$ are provided. In order that the packet switching information can undergo switching similarly to the circuit switching information, it is necessary for a channel match logic circuit 102 to effectively operate also for the packet switching information. In the case of circuit switching the number of blocks having the same destination is limited but in the case of the packet switching, blocks arrive unlimitedly so long as idle blocks are available. Accordingly, even with the channel match logic circuit 102 operating to prevent blocks of the same destination from colliding with each other at a time point, the blocks can not all be rearranged in some instances. The second packet buffers $123_1$ to $123_n$ are adapted to accommodate blocks which have been invalidated for rearrangement and overflown. As described previously, the channel match logic circuit 102 has been informed, by the heading of a frame, of the number of blocks carrying the circuit switching information within the frame, and it can permit the circuit switching information to be processed preferentially and only the packet switching information to be bypassed. Once stored in the second packet buffers $123_1$ to $123_n$, the bypassed blocks are immediately returned to positions near the heading of the first packet buffers $122_1$ to $122_n$. This operation repeats itself until channel matching succeeds. This embodiment is advantageous in that the space switch can be adapted for the integrated circuit/packet information and packet buffers in association with respective destinations can be dispensed with.

Thus, this embodiment can materialize a circuit/packet integrated CM.

As is clear from the foregoing, the CM can be constructed using wired logic only and can be a passive module which does not need any control processor.

Referring to FIG. 17, there is illustrated an example of system configuration. This configuration intends to distribute or disperse load and danger by the provision of a plurality of CM's 1001 and 1002. Since the CM's 1001 and 1002 are passive modules having no processor for call processing, the distribution of load and the dispersal of danger can be realized with ease. The information from individual incoming FM's 2001 to 2004 can reach individual outgoing FM's 3001 to 3004 via either of the CM's 1001 and 1002 and consequently, in the event of failure of one CM, the operation can continue via the other CM. Unless the valid CM is overloaded, no trouble occurs.

According to the embodiment of FIG. 17, each FM is required to monitor only its own circuits and the concentrated resource management is not needed, thereby eliminating a bottleneck which would otherwise be caused in the processing by the common unit, i.e., the CM so as to improve throughput of the overall switching system. The high throughput of the overall switching system can also be attributable to the fact that while each FM is an independent distributed module which has a processor of its own and therefore can fully take care of the call processing, the common unit or CM has full wired logic which has no call processing processor and can do away with a bottleneck caused by the throughput of a processor. Further, the CM can fulfill itself in switching without assistance of a processor and a switch holding memory will not leave behind any aging influence even if becomes faulty intermittently and besides will remain almost unaffected even if a fault occurs in any one of the FM's, thereby giving rise to realization of a highly reliable distributed type switching system.

It will therefore be appreciated that the distribution of load and the decentralization of risks can lead to realization of a high-throughput and highly reliable distributed type switching system.

In summary, the present invention has the following advantages.

The star-type distributed switching system in which the FM's are distributed around the CM in the heart, especially, the circuit/packet integrated distributed type switching system capable of integrally handling circuit switching and packet switching can be realized. Specifically, since the CM has no call processing function and fundamentally, it can be realized with wired logic, thus preventing the throughput of the system from being limited by a bottleneck which would otherwise be caused by a processor. Further, the distribution of a plurality of CM's is easy to achieve.

Blocks of identical format are used to switch the circuit switching information and the packet switching information to thereby improve the exchange from the economical standpoint. Multi-dimensional distribution and high-speed wide band services can be offered integratedly to subscribers. For the circuit switching information, switching is effected preferentially, leading to advantages that delay time is invariable and absolute delay time is minimized. More particularly, the circuit switching call such as voice can be switched within invariable and minimal delay time while the storage switching call having burst property can be switched using the same channel. In addition, all time slots unoccupied by the circuit switching call can be allocated to the storage switching call to realize a highly efficient economical channel.

The channel is of a full wired logic which is not dominated by the throughput of a processor or the like factor and can readily have throughput complying with the scale of the system. Processings at most parts of the system can be effected in distributing and parallel relationship with respective highways and the cycle time required for processing can therefore be reduced.

We claim:

1. A switching system comprising:

a plurality of front-end modules each operating to perform a call processing of information in association with a subscriber line or a trunk line; and at least one central module for interconnecting said plurality of front-end modules and switching user information between said front-end modules, in units of a block accommodating the information and having a header which contains connection control information for identifying a destination of the information and causing said user information to be switched through said central module; and said central module being a self-routing switch.

2. A switching system according to claim 1 wherein said front-end modules are connected to said central module via inter-module highways each having frames occurring at a predetermined period and a plurality of time slots contained in each frame to carry blocks.

3. A switching system according to claim 1 wherein said central module comprises:

a plurality of time switches connected to said plurality of front-end modules, a space switch connected to said plurality of time switches, and means for generating a read address or a write address for each time switch from header information for each block incoming from each front-end module, in such a manner that a plurality of blocks having the same destination do not coexist at a time; and wherein said address generating means comprises a first status managing memory for monitoring every frame an idle/busy status of a link in association with an incoming highway of said space switch, a second status managing memory for monitoring every frame an idle/busy status of a link in association with an outgoing highway of said space switch, and a circuit for generating the read address or the write address for each of said plurality of time switches by looking up said first and second status managing memories.

4. A switching system comprising:

a plurality of front-end modules each adapted to perform switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways information in frames occurring at a predetermined period, each frame having a plurality of blocks;

wherein each of said front-end modules comprises:

means for determining a destination path for communicating information coming from the subscriber line or the trunk line;

means for transmitting a block which accommodates the information and a header containing a destination front-end module number to a highway connected with said central module by loading said block on the time slots on said highway; and status managing means for storing idle/busy status of the subscriber line or the trunk line.

5. A switching system comprising:

a plurality of front-end modules each adapted to perform switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein each of said front-end modules comprises:

status managing means for storing idle/busy status of the subscriber line or the trunk line.

6. A switching system comprising:

a plurality of front-end modules each adapted to perform switching processing in association with a subscriber line or a trunk line;

each of said front-end modules having means for transmitting on inter-module highways user information to be delivered between said front-end modules in a unit of a block having a fixed length, each block accommodating information as a part of the user information and a header appended thereto, said header including connection control information for controlling switching; and comprising status managing means for storing idle/busy status of the subscriber line or the trunk line; and at least one central module for interconnecting said plurality of front-end modules via said inter-module highways, and including means for switching user information through said central module between said front-end modules in a unit of said block, said switching through said central module is controlled by said connection control information of said header in said block;

said central module being a self-routing switch having no call processor for call processing.

7. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for determining a destination path for communicating information coming from the subscriber line or the trunk line, means for transmitting a block which accommodates the information and a header containing a destination front-end module number to a highway connected with said central module by loading said block on said highway, and status managing means for storing idle/busy status of the subscriber line or the trunk line.

8. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including call identifier for controlling said switching;

said central module being a self-routing switch;

wherein said front-end modules are connected to said central module via inter-module highways, each front-end module having means for transmitting on said inter-module highways said block;

wherein each of said front-end modules comprises:

means for determining a destination path for communicating information coming from the subscriber line or the trunk line, means for transmitting a block which accommodates the information and a header containing a destination front-end module number to a highway connected with said central module by loading said block on said highway, and status managing means for storing idle/busy status of the subscriber line or the trunk line.

9. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for determining a destination path for communicating information coming from the subscriber line or the trunk line, means for transmitting a destination front-end module number in accordance with each block to said central module, and status managing means for storing idle/busy status of the subscriber line or the trunk line.

10. A switching system comprising a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for transmitting a destination front-end module number in accordance with each block to said central module, and status managing means for storing idle/busy status of the subscriber line or the trunk line.

11. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for determining a destination path for communicating information coming from the subscriber line or the trunk line, and status managing means for storing idle/busy status of the subscriber line or the trunk line.

12. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including connection control information for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for transmitting a block which accommodates the information and a header containing a destination front-end module number to a highway connected with said central module by loading said block on said highway, and status managing means for storing idle/busy status of the subscriber line or the trunk line.

13. A switching system comprising:

a plurality of front-end modules each adapted to perform a switching processing in association with a subscriber line or a trunk line; and at least one central module for interconnecting said plurality of front-end modules, and including means for switching user information through said central module between said front-end modules in a unit of a block, each block accommodating information as a part of the user information and a header appended thereto, said header including call identifier for controlling said switching through said central module;

said central module being a self-routing switch;

wherein said front-end modules are connected to said central module via inter-module highways, each front-end module having means for transmitting on said inter-module highways said block;

wherein each of said front-end modules comprises:

means for determining a destination path for communicating information coming from the subscriber line or the trunk line, and status managing means for storing idle/busy status of the subscriber line or the trunk line.

14. A distributed switching system, comprising:

a plurality of front-end modules operating independently of each other;

each front-end module having a call processing processor for performing call processing in association with a subscriber line or a trunk line, and means for transmitting on inter-module highways user information between said front-end modules in a unit of a block having a fixed length, each block accommodating information representing at least a part of the user information and a header appended thereto, said header including connection control information for controlling switching; and at least one central module for interconnecting said plurality of front-end modules via said inter-module highways, said central module including means for switching user information through said central module between said front-end modules in a unit of said block, said switching being controlled by said connection control information of said header in said block;

said central module being a self-routing switch.

15. A distributed switching system comprising:

a plurality of front-end modules operating independently of each other;

each front-end module having a call processing processor for determining a destination path for communication information coming from a subscriber line or a trunk line, and means for transmitting on inter-module highways user information between said front-end modules in a unit of a block having a fixed length, each block accommodating information representing at least a part of the user information and a header appended thereto, said header including connection control information for controlling switching; and at least one central module for interconnecting said plurality of front-end modules via said inter-module highways, said central module including means for switching user information through said central module between said front-end modules in a unit of said block, said switching being controlled by said connection control information of said header in said block;

said central module being a self-routing switch.

16. A distributed switching system, according to claim 14, further comprising:

status managing means, included in each of said front-end modules, for storing idle/busy status of the subscriber line or the trunk line.

17. A distributed switching system, according to claim 14, further comprising:

status managing means, included in each of said front-end modules, for storing idle/busy status of the subscriber line or the trunk line.

18. A distributed switching system, according to claim 15, wherein said connection control information included in said header contains a destination front-end module number for controlling switching.

19. A distributed switching system comprising:

a plurality of front-end modules operating independently of each other, each of said front-end modules having a call processing processor for performing switching processing in association with a subscriber line or a trunk line and for effecting priority control of user information, and means for transmitting on inter-module highways user information between said front-end modules in a unit of a block having a fixed length, each block accommodating information representing at least a part of the user information and a header appended thereto, said header including connection control information containing a destination front-end module number for use in controlling switching; and at least one central module for interconnecting said plurality of front-end modules via said inter-module highways, said control module including means for switching user information through said central module between said front-end modules in a unit of said block, said switching being controlled by said connection control information of said header in said block;

said control module being a self-routing switch.

20. A distributed switching system, according to claim 19, wherein said priority control is based on whether said user information is voice or data information.

21. A distributed switching system comprising:

at least one front-end module accommodating a first incoming/outgoing circuit; and at least one central module connected to said front-end module through a second incoming/outgoing circuit;

said front-end module including call setting means, accommodating said first incoming/outgoing circuit, for setting a call from said first incoming/outgoing circuit, and header setting means for adding information to a header of a fixed-length block to be transmitted from said first incoming/outgoing circuit to said second incoming/outgoing circuit, said information indicating a front-end module to be connected;

said central module including self-routing means, said self-routing means having a self-routing function for switching said fixed-length block through said central module in accordance with said information contained in said header of said fixed-length block thereby transmitting said fixed-length block to said front-end module to be connected via said second incoming/outgoing circuit;

said second incoming/outgoing circuit being operative to transmit said fixed-length block having said header and an information field, said header containing said information indicating said front-end module to be connected and said information field containing information to be transmitted from said first incoming/outgoing circuit to said front-end module to be connected.

22. A distributed switching system, according to claim 21 wherein said front-end module further comprises:

a call processing processor for performing call processing in association with said first incoming/outgoing circuit.

23. A distributed type switching system comprising:

a plurality of front-end modules, each front-end module operatively associated with a first incoming/outgoing circuit;

a second incoming/outgoing circuit for interconnecting said plurality of front-end modules;

each front-end module including call setting means for establishing a call from said first incoming/outgoing circuit to said second incoming/outgoing circuit, and header setting means for adding information to a header of a fixed-length block to be transmitted from said first incoming/outgoing circuit to said second incoming/outgoing circuit, said information indicating a destination to which said call is to be established via said second incoming/outgoing circuit and causing said fixed-length block to be self-routed through a self-routing switch;

said second incoming/outgoing circuit being operative to transmit said fixed-length block having said header and an information field, said header containing said information indicating a destination to which said call is to be established via said second incoming/outgoing circuit and said information field containing information to be transmitted from said first incoming/outgoing circuit to said destination.

24. A distributed switching system comprising:

a plurality of front-end modules each having control means for performing call processing control, means for determining a destination path for communication information coming from a subscriber line or a trunk line, means for transmitting to a highway a block which accommodates the communication information and a header containing a destination front-end module information, means for managing the status of the subscriber line or trunk line by constantly storing an idle/busy status indication thereof, means for deciding the idle/busy status of the subscriber line or trunk line, and means for transmitting and receiving a result of the decision between the plurality of front-end modules; and at least one central module for interconnecting said plurality of front-end modules via said highway, said control module includes a self-routing channel, for switching communication information through said central module between said front-end modules in a unit of said block, said switching being controlled by said destination front-end module information of said header in said block.

25. A distributed switching system having a front end-module operatively associated with a first incoming/outgoing circuit and a second incoming/outgoing circuit, said front-end module comprising:

call setting means for establishing a call from said first incoming/outgoing circuit to said second incoming/outgoing circuit; and header setting means for adding information to a header of a fixed-length block to be transmitted from said first incoming/outgoing circuit to said second incoming/outgoing circuit, said information indicating a destination to which said call is to be established via said second incoming/outgoing circuit and causing said fixed-length block to be self-routed through a self-routing switch;

said second incoming/outgoing circuit being operative to transmit said fixed-length block having said header and an information field, said header containing said information indicating a destination to which said call is to be established via said second incoming/outgoing circuit and said information field containing information to be transmitted from said first incoming/outgoing circuit to said destination.

26. A distributed switching system method comprising the steps of:

establishing a call from a first incoming/outgoing circuit to a second incoming/outgoing circuit and adding information to a header of a fixed-length block to be transmitted from said first incoming/outgoing circuit to said second incoming/outgoing circuit, said information indicating a destination to which said call is to be established via said second incoming/outgoing circuit and causing said fixed-length block to be self-routed through a self-routing switch; and transmitting said fixed-length block having said header and an information field to said destination to which said call is to be established, said information field containing information to be transmitted from said first incoming/outgoing circuit to said destination.

27. A distributed switching method having comprising the steps of:

establishing a call from a first incoming/outgoing circuit to a second incoming/outgoing circuit;

adding information to a header of a fixed-length block to be transmitted from said first incoming/outgoing circuit to said second incoming/outgoing circuit, said information indicating a destination to which said call is to be established via said second incoming/outgoing circuit and causing said fixed-length block to be self-routed through a self-routing switch; and transmitting said fixed-length block having said header and an information field to said destination to which said call is to be established, said information field containing information to be transmitted from said first incoming/outgoing circuit to said destination.

28. A distributed switching said method comprising the steps of performing switching processing in association with a subscriber line or a trunk line;

transmitting on highways user information in a unit of a block having a fixed-length, each block accommodating information representing at least a part of the user information and a header appended thereto, said header including connection control information for controlling switching; and switching user information on said highways through a self-routing switch in a unit of said block in accordance with said connection control information of said header in said block.

29. A distributed switching system method comprising the steps of:

determining a destination path of communication information coming from a subscriber line or a trunk line;

transmitting on highways user information in a unit of a block having a fixed-length, each block accommodating information representing at least a part of the said user information and a header appended thereto, said header including connection control information for controlling switching; and switching user information on said highways through a self-routing switch in a unit of said block in accordance with said connection control information of said header in said block.

30. A distributed switching method, according to claim 28, further comprising the step of:

storing idle/busy status of the subscriber line or the trunk line.

31. A distributed switching system method comprising the steps of:

performing switching processing in association with a subscriber line or a trunk line and effecting priority control of user information;

transmitting on highways user information in a unit of a block having a fixed-length, each block accommodating information representing at least a part of the user information and a header appended thereto, said header including connection control information containing destination for use in controlling switching; and switching user information on said highways through a self-routing switch in a unit of said block in accordance with said connection control information of said header in said block, said self-routing switch not including a call processor for call processing.

32. A distributed switching system, comprising:

a plurality of front-end modules operating independently of each other;

each front-end module having a call processing processor for processing a call incoming from a subscriber line or a trunk line and a transmission line for transmitting to inter-module highways information in a unit of a packet (cell) of a fixed length, accommodating a header and user information, said header containing connection control information; and at least one central switching module for connecting said plurality of front-end modules via said inter-module highways, said central module including a switch for autonomously switching said user information through said central module to a destination front-end module in a unit of said fixed-length packet by using said connection control information contained in the header of the fixed-length packet;

said central module being a self-routing switch.

33. A distributed switching system, comprising:

first switching means having means for performing a call processing in accordance with information from a subscriber line or trunk line; and second switching means, coupled to said first switching means, for switching information transmitted/received by the subscriber line or trunk line, said switching by said second switching means being performed in units of a fixed-length packet which has a header added thereto that contains destination information indicating a destination of said transmitted/received information, said switching by said second switching means being performed autonomously in accordance with contents of said header;

said second switching means being a self-routing switch for switching fixed-length packets each having a header by using information indicating a destination contained in said header.

34. A distributed switching system, comprising:

first switching means having means for performing a call processing in accordance with information from a subscriber line or trunk line; and second switching means, coupled to said first switching means, for switching information transmitted/received by the subscriber line or trunk line, said switching by said second switching means being performed in units of a fixed-length packet which has a header added thereto that contains destination information indicating a destination of said transmitted/received information, said switching by said second switching means being performed autonomously in accordance with contents of said header;

wherein said first switching means includes a call-processing processor to perform said call processing and said second switching means being a self-routing switch which is independent of said call processing and includes a hardware circuitry, to switch fixed-length packets.

35. A distributed switching system, comprising:

first switching means having means for performing a call processing in accordance with information from a subscriber line or trunk line; and second switching means, coupled to said first switching means, for switching information transmitted/received by the subscriber line or trunk line, said switching by said second switching means being performed in units of a fixed-length packet which has a header added thereto that contains destination information indicating a destination of said transmitted/received information, said switching by said second switching means being performed autonomously in accordance with contents of said header;

said second switching means being a self-routing switch which includes means for extracting destination information contained in the header of a fixed-length packet and a further switch for switching said fixed-length packet autonomously by using said destination information, said further switch including time switches connected to said plurality of first switching means and a space switch for interconnecting said time switches, said further switch further including a first status managing means for monitoring an idle/busy status of an incoming link of said space switch, a second status managing means for monitoring an idle/busy status of an outgoing link of said space switch and controlling means for controlling said plurality of time switches by referring to said destination information and first and second status managing means;

wherein said first status managing means includes a first memory for storing, as data thereof, the idle/busy status of incoming links of said space switch at addresses defined by that information contained in headers which indicates call-sending first switching means, said second status managing means includes a second memory for storing, as data thereof, the idle/busy status of outgoing links of said space switch at addresses defined by that information contained headers which indicates call-receiving first switching means, said controlling means includes means for preventing collision of a plurality of fixed-length packets, wherein said collision preventing means executes a calculation by using outputs of said first and second memories to find an idle link of the space switch and converts the result of the calculation to a read or write address of a time switch so that a fixed-length packet output from the time switch is input to said idle link.

36. A distributed switching system, comprising:

first switching means having means for performing a call processing in accordance with information from a subscriber line or trunk line; and second switching means, being a self-routing switch coupled to said first switching means, for switching information transmitted/received by the subscriber line or trunk line, said switching by said second switching means being performed in units of a fixed-length packet which has a header added thereto that contains destination information indicating a destination of said transmitted/ received information, said switching by said second switching means being performed autonomously in accordance with contents of said header;

wherein said first switching means includes a plurality of first switching means each coupled to said second switching means via transmitting means for carrying a plurality of fixed-length packets and wherein each of said plurality of first switching means includes:

means for determining a destination of information input from a subscriber line or trunk line;

means for sending out onto an associated transmitting means a fixed-length packet containing said input information and information indicating one of said plurality of first switching means which is a destination of said input information;

status managing means for storing idle/busy status of a subscriber line or trunk line;

means for deciding whether a subscriber line or trunk line is idle or busy; and means for transmitting/receiving an output of said deciding means to/from that first switching means, via an associated transmitting means, to/from which said input information is transmitted/received;

wherein said call processing is such that, after sending first switching means determines an information destination, a call is sent by use of fixed-length packets each comprising:

call controlling information containing call identification information; and a header added to said call controlling information, said header including destination information specifying destination first switching means, and that, upon reception of said call controlling information by the destination first switching means, said destination first switching means determines whether the subscriber line or trunk line by which said call is to be received is idle or busy and, then idle, captures said subscriber line or trunk line and then responds to said reception of said call controlling information by using a fixed-length packet formed by adding a header containing destination information indicating the call sending first switching means to call controlling information containing call identification information, said call processing is completed upon reception of the response by said sending first switching means.

* * * * *